United States Patent
Chen et al.

(10) Patent No.: US 12,003,733 B2
(45) Date of Patent: Jun. 4, 2024

(54) METHOD AND APPARATUS FOR PREDICTION REFINEMENT WITH OPTICAL FLOW FOR AN AFFINE CODED BLOCK

(71) Applicant: HUAWEI TECHNOLOGIES CO., LTD., Guangdong (CN)

(72) Inventors: Huanbang Chen, Shenzhen (CN); Haitao Yang, Shenzhen (CN); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 336 days.

(21) Appl. No.: 17/478,697

(22) Filed: Sep. 17, 2021

(65) Prior Publication Data
US 2022/0078442 A1     Mar. 10, 2022

Related U.S. Application Data

(63) Continuation of application No. PCT/CN2020/080412, filed on Mar. 20, 2020.
(Continued)

(51) Int. Cl.
*H04N 19/139* (2014.01)
*H04N 19/119* (2014.01)
(Continued)

(52) U.S. Cl.
CPC ......... *H04N 19/139* (2014.11); *H04N 19/119* (2014.11); *H04N 19/172* (2014.11);
(Continued)

(58) Field of Classification Search
None
See application file for complete search history.

(56) References Cited

U.S. PATENT DOCUMENTS

| 2018/0309983 A1 | 10/2018 | Heo et al. | |
|---|---|---|---|
| 2018/0376166 A1* | 12/2018 | Chuang | H04N 19/583 |
| 2020/0221122 A1* | 7/2020 | Ye | H04N 19/577 |

FOREIGN PATENT DOCUMENTS

| CN | 104717501 A | 6/2015 |
|---|---|---|
| CN | 105847804 A | 8/2016 |

(Continued)

OTHER PUBLICATIONS

Jiancong (Daniel) Luo et al., "CE2-related: Prediction refinement with optical flow for affine mode", Joint Video Experts Team (JVET), Mar. 19, 2019, [JVET-N0236-r5], 8 pages.
(Continued)

*Primary Examiner* — Rebecca A Volentine
(74) *Attorney, Agent, or Firm* — WOMBLE BOND DICKINSON (US) LLP

(57) ABSTRACT

The present invention relates to an apparatus, an encoder, a decoder and corresponding methods for prediction refinement with optical flow (PROF) for an affine coded block, in which when a plurality of optical flow decision conditions are fulfilled for the affine coded block, performing a PROF process for a current sub-block of the affine coded block to obtain refined prediction sample values of the current sub-block of the affine coded block. After the sub-block based affine motion compensation is performed, a prediction sample value of the current sample of the current sub-block is refined by adding a delta prediction value. Thus, it allows for a better trade-off between coding complexity and prediction accuracy.

30 Claims, 16 Drawing Sheets

Related U.S. Application Data

(60) Provisional application No. 62/839,765, filed on Apr. 28, 2019, provisional application No. 62/821,440, filed on Mar. 20, 2019.

(51) Int. Cl.
    *H04N 19/172*     (2014.01)
    *H04N 19/174*     (2014.01)
    *H04N 19/176*     (2014.01)
    *H04N 19/52*     (2014.01)

(52) U.S. Cl.
    CPC ......... *H04N 19/174* (2014.11); *H04N 19/176* (2014.11); *H04N 19/52* (2014.11)

(56) References Cited

FOREIGN PATENT DOCUMENTS

| | | |
|---|---|---|
| WO | 2018113658 A1 | 6/2018 |
| WO | 2019010156 A1 | 1/2019 |

OTHER PUBLICATIONS

ITU-T H.261 (Mar. 1993), Line Transmission of Non-Telephone Signals, Video Codec for Audiovisual Services AT p x 64 kbits, total 29 pages.

ITU-T H.262 (Feb. 2012), Series H: Audiovisual and Multimedia Systems, Infrastructure of audiovisual services—Coding of moving video Information technology—Generic coding of moving pictures and associated audio information: Video: Frame packing arrangement signalling for 3D content, total 238 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Xiaoyu Xiu et al.,"Non-CE4/AHG17: On high-level control flags of BDOF and PROF", Joint Video Experts Team (JVET) of ITU-T SG 16 WP 3 and ISOIIEC JTC 1/SC 29/WG 11, 16th Meeting: Geneva, CH, Oct. 1-11, 2019, Document: JVET-P0524 r1,total:6 pages.

Yang-Ho Cho et al., "Enhancement for Temporal Resolution of Video Based on Multi-Frame Feature Trajectory and Occlusion Compensation",ICIP 2009,total:4pages.

\* cited by examiner

METHOD AND APPARATUS FOR PREDICTION REFINEMENT WITH OPTICAL FLOW FOR AN AFFINE CODED BLOCK

CROSS-REFERENCE TO RELATED APPLICATIONS

This patent application is a continuation of International Application No. PCT/CN2020/080412, filed on Mar. 20, 2020, which claims the priority to U.S. Provisional Patent Application No. 62/821,440, filed Mar. 20, 2019, and the priority to U.S. Provisional Patent Application No. 62/839,765, filed Apr. 28, 2019. All of the aforementioned patent applications are hereby incorporated by reference in their entireties.

TECHNICAL FIELD

Embodiments of the present disclosure generally relate to the field of picture processing and more particularly to a method to refine the sub-block based affine motion compensated prediction with optical flow when one or more constraints are required.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Recently, an affine tool is introduced into Versatile Video Coding, theoretically affine motion model parameters can be used to derive the motion vector of each sample in a coding block. However, due to the high complexity for generating sample-based affine motion compensated prediction, a sub-block based affine motion compensation method is used. In this method, the coding block is divided into sub-blocks, each of which is assigned with a motion vector (MV) derived from the affine motion model parameters. However, it loses prediction accuracy due to sub-block based prediction. Thus, a good trade-off between coding complexity and prediction accuracy needs to be achieved.

SUMMARY

Embodiments of the present application provide apparatuses and methods for encoding and decoding according to the independent claims. Embodiments of the present application provide apparatuses and methods for prediction refinement with optical flow (PROF) for an affine coded block, so that a good trade-off between the complexity and sub-block based affine prediction accuracy may be achieved.

Embodiments are defined by the features of the independent claims, and further advantageous implementations of the embodiments by the features of the dependent claims.

Particular embodiments are outlined in the attached independent claims, with other embodiments in the dependent claims.

The foregoing and other objects are achieved by the subject matter of the independent claims. Further implementation forms are apparent from the dependent claims, the description and the figures.

According to a first aspect, the disclosure relates to a method for prediction refinement with optical flow (PROF) for an affine coded block (i.e., a block encoded or decoded using an affine tool) is provided. The method is applied to a sub-block of samples within the affine coded block. The method is performed by encoding or decoding apparatus. The method may include:

performing a PROF process for a current sub-block of the affine coded block to obtain refined prediction sample values (namely, final prediction sample values) of the current sub-block (such as each subblock) of the affine coded block, wherein a plurality of constraint conditions for applying PROF are not fulfilled or satisfied for the affine coded block;

wherein the performing a PROF process for a current sub-block of the affine coded block comprises: performing an optical flow processing for the current sub-block to obtain a delta prediction value of a current sample of the current sub-block; and obtaining a refined prediction sample value of the current sample based on the delta prediction value of the current sample and a prediction sample value of the current sample of the current sub-block (performing an optical flow processing for the current sub-block to obtain delta prediction values of the current sub-block; and obtaining the refined prediction sample values of the current sub-block based on the delta prediction values of the current sub-block and prediction sample values of the current sub-block). It can be understood that when the refined prediction sample values of each sub-block of the affine coded block are generated, the refined prediction sample values of the affine coded block are naturally generated.

Thus, an improved method is provided allowing for a better trade-off between coding complexity and prediction accuracy to be achieved. The prediction refinement with optical flow (PROF) process is conditionally performed to refine the sub-block based affine motion compensated prediction with optical flow in pixel/sample level granularity. These conditions ensure that the computations involved in the PROF only occur when prediction accuracy can be improved, thereby reducing unnecessary computation complexity increase. Therefore, the beneficial effects achieved by the technology disclosed herein improve the overall compression performance of the coding method.

It is noted that the term "block", "coding block" or "image block" used in the present disclosure can include transform units (TUs), prediction units (PUs), coding units (CUs), etc. In VVC, transform units and coding units are mostly aligned except in a few scenarios when TU tiling or sub block transform (SBT) is used. It can be understood that the terms "block", "image block", "coding block" and "picture block".

The terms "affine block", "affine picture block", "affine coded block" and "affine motion block" may be used interchangeably herein. The terms "sample" and "pixel" may be used interchangeably with each other in the present disclosure. The terms "prediction sample value" and "prediction pixel values" may be used interchangeably with each other in the present disclosure. The terms "sample location" and "pixel location" may be used interchangeably with each other in the present disclosure.

In a possible implementation form of the method according to the first aspect as such, before the performing a PROF process for a current sub-block of the affine coded block, the method further comprises: determining that the plurality of constraint conditions for applying PROF are not fulfilled for the affine coded block.

In a possible implementation form of the method according to the first aspect as such, the plurality of constraint conditions for applying PROF comprises: first indication information indicates that PROF is disabled for a picture containing the affine coded block or first indication information indicates that PROF is disabled for slices associated with a picture containing the affine coded block; and second indication information indicates no partition of the affine coded block, i.e. the variable fallbackModeTriggered is set to 1. It can be understood that when the variable fallbackModeTriggered is set to 1, no partition of the affine coded block is required, that is, each sub-block of the affine coded block has the same motion vector. This indicates that the affine coded block only has translational motion. When the variable fallbackModeTriggered is set to 0, partition of the affine coded block is required, that is, each sub-block of the affine coded block has a respective motion vector. This indicates that the affine coded block has non-translational motion.

In the present disclosure, it is allowed that PROF is not applied in some cases or situations for the affine coded block. Those cases or situations are determined according to the constraints for applying the PROF. In this way, a better trade-off between coding complexity and prediction accuracy can be achieved.

In a possible implementation form of the method according to any preceding implementation of the first aspect or the first aspect as such, the performing an optical flow processing for the current sub-block to obtain a delta prediction value of a current sample of the current sub-block comprises:

obtaining a second prediction matrix, (In an example, the second prediction matrix is generated based on a first prediction matrix which corresponds to prediction sample values of the current sub-block. Here, the prediction sample values of the current sub-block may be obtained by performing subblock-based affine motion compensation for the current sub-block.) wherein a size of the second prediction matrix is greater than the size of the first prediction matrix (for example, the first prediction matrix has the size of sbWidth*sbHeight and the second prediction matrix has the size of (sbWidth+2)*(sbHeight+2) and the variables sbWidth and sbHeight represent the width and the height of the current subblock, respectively.);
That is, the obtaining a second prediction matrix comprises: generating a first prediction matrix based on motion information of the current sub-block, wherein elements of the first prediction matrix correspond to prediction sample values of the current sub-block, and generating the second prediction matrix based on the first prediction matrix; or generating the second prediction matrix based on the motion information of the current sub-block;

generating a horizontal prediction gradient matrix and a vertical prediction gradient matrix based on the second prediction matrix, wherein a size of the second prediction matrix is greater than or equal to sizes of the horizontal prediction gradient matrix and the vertical prediction gradient matrix; (for example, the horizontal prediction gradient matrix or the vertical prediction gradient matrix has the size of sbWidth*sbHeight and the second prediction matrix has the size of (sbWidth+2)*(sbHeight+2)); and calculating a delta prediction value ($\Delta I(i,j)$) of a current sample of the current sub-block based on a horizontal prediction gradient value of the current sample in the horizontal prediction gradient matrix, a vertical prediction gradient value of the current sample in the vertical prediction gradient matrix, and a difference (MVD) between a motion vector of the current sample of the current sub-block and a motion vector of a center sample of the sub-block. It can be understood that the MVD has a horizontal component and a vertical component. The horizontal prediction gradient value of the current sample in the horizontal prediction gradient matrix corresponds to the horizontal component of the MVD, and the vertical prediction gradient value of the current sample in the vertical prediction gradient matrix corresponds to vertical component of the MVD.

It is noted that the affine block can be a coding block or a decoding block of a picture of the video signal. The current sub-block of the affine coded block is, for example, a 4×4 block. The luma location (xCb, yCb) denotes that location of the top-left sample of the affine coded block relative to the top-left sample of the current picture. Samples of the current sub-block can be referred to using absolute positions of the samples with respect to (or relative to) the top-left sample of the picture, e.g., (x, y), or relative positions of the samples with respect to the top-left sample of the sub-block (in combination with other coordinates), e.g., (xSb+i, ySb+j). Here, (xSb, ySb) is the coordinate of the upper left sample of the sub-block with respect to the upper left sample of the picture.

The first prediction matrix can be a two-dimensional array that include rows and columns and an element of the array can be referred to using (i,j) where i is a horizontal/row index and j is a vertical/column index. The range of i and j can be, for example, i=0 . . . sbWidth−1 and j=0 . . . sbHeight−1. Here, sbWidth indicates the width of the sub-block, and sbHeight indicates the height of the subblock. In some examples, the size of the first prediction matrix is the same as the size of the current block. For example, the size of the first prediction matrix can be 4×4, and the current block has a size of 4×4.

The second prediction matrix can be a two-dimensional array that include rows and columns and an element of the array can be referred to using (i,j) where i is a horizontal/row index and j is a vertical/column index. The range of i and j can be, for example, i=−1 . . . sbWidth and j=−1 . . . sbHeight. Here, sbWidth indicates the width of the subblock, and sbHeight indicates the height of the subblock. In some examples, the size of the second prediction matrix is larger than the size of the first prediction matrix. That is, the size of the second prediction matrix can be larger than the size of the current block. For example, the size of the second prediction matrix can be (sbWidth+2)*(sbHeight+2), whereas the current block has a size of sbWidth*sbHeight.

For example, the size of the second prediction matrix can be 6×6, whereas the current block has a size of 4×4.

The horizontal and vertical prediction gradient matrices can be any two-dimensional array that include rows and columns and an element of the array can be referred to using (i,j) where x is a horizontal/row index and y is a vertical/column index. The range of i and j can be, for example, i=0 . . . sbWidth−1 and j=0 . . . sbHeight−1 . . . sbWidth indicates the width of the subblock, and sbHeight indicates the height of the subblock. In some examples, the size of the horizontal and vertical prediction gradient matrices is the same as the size of the current block. For example, the size of the horizontal and vertical prediction gradient matrices can be 4×4, and the current block has a size of 4×4.

An element of the horizontal prediction gradient matrix corresponds to an element of the vertical prediction gradient matrix if the element's position in the horizontal prediction gradient matrix, (x, y) is the same as the element's position in the vertical prediction gradient matrix (p, q), i.e., (x, y)=(p, q).

Thus, a PROF process is allowed to refine the sub-block based affine motion compensated prediction with optical flow with the sample level granularity without increasing the memory access bandwidth (due to the second prediction matrix is based on the first prediction matrix or the (original) prediction sample values of the current sub-block) thereby achieving a finer granularity of motion compensation.

In a possible implementation form of the method according to any preceding implementation of the first aspect or the first aspect as such, a motion vector difference between a motion vector of a current sample unit (for example, a 2×2 sample block) containing the current sample and a motion vector of a center sample of the sub-block is used as the difference between the motion vector of the current sample of the current sub-block and the motion vector of the center sample of the sub-block. Here, the motion vector of a center sample of the sub-block can be understood as the MV of the subblock (i.e. the subblock MV) to which the current sample (i,j) belongs. By using the sample unit, such as the 2×2 sample block, to calculate the motion vector difference, it is allowed to balance processing overheads and prediction accuracy. In a possible implementation form of the method according to any preceding implementation of the first aspect or the first aspect as such, an element of the second prediction matrix is represented by $I_1(p, q)$, wherein a value range of p is [−1, sbW], and a value range of q is [−1, sbH];

an element of the horizontal prediction gradient matrix is represented by X (i,j) and corresponds to sample (i,j) of the current sub-block in the affine coded block, wherein a value range of i is [0, sbW−1], and a value range of j is [0, sbH−1]; and an element of the vertical prediction gradient matrix is represented by Y (i,j) and corresponds to sample (i,j) of the current sub-block in the affine coded block, wherein a value range of i is [0, sbW−1], and a value range of j is [0, sbH−1]; wherein sbW represents a width of the current sub-block in the affine coded block, sbH represents a height of the current sub-block in the affine coded block.

In another representation manner, an element of the second prediction matrix is represented by $I_1(p, q)$, wherein a value range of p is [0, subW+1], and a value range of q is [0, subH+1];

an element of the horizontal prediction gradient matrix is represented by X (i,j) and corresponds to sample (i,j) of the current sub-block in the affine coded block, wherein a value range of i is [1, sbW], and a value range of j is [1, sbH]; and an element of the vertical prediction gradient matrix is represented by Y (i,j) and corresponds to sample (i,j) of the current sub-block in the affine coded block, wherein a value range of i is [1, sbW], and a value range of j is [1, sbH]; wherein sbW represents a width of the current sub-block in the affine coded block, sbH represents a height of the current sub-block in the affine coded block.

It can be understood that the top-left sample (or the origin of coordinate) is located at (1, 1) for p has a value from [0, subW+1] and q has a value from [0, subH+1]; while, the top-left sample (or the origin of coordinate) is located at (0, 0) for p has a value from [−1, subW] and q has a value from [−1, subH].

In a possible implementation form of the method according to any preceding implementation of the first aspect or the first aspect as such, before the performing a PROF process for a current sub-block of the affine coded block, the method further comprises: performing subblock-based affine motion compensation for the current sub-block of the affine coded block to obtain (original or to-be-refined) prediction sample values of the current sub-block.

According to a second aspect of the disclosure, a method for prediction refinement with optical flow (PROF) for an affine coded block is provided, the method comprising: performing a PROF process for a current sub-block of the affine coded block to obtain refined prediction sample values (namely, final prediction sample values) of the current sub-block of the affine coded block, wherein a plurality of optical flow decision conditions are fulfilled for the affine coded block; Here, the plurality of optical flow decision conditions are fulfilled, means that all constraints for applying PROF are not fulfilled;

wherein the performing a PROF process for a current sub-block of the affine coded block comprises: performing an optical flow processing for the current sub-block to obtain a delta prediction value of a current sample of the current sub-block; and obtaining a refined prediction sample value of the current sample based on the delta prediction value of the current sample and a (original or to-be-refined) prediction sample value of the current sample of the current sub-block.

Thus, an improved method is provided allowing for a better trade-off between coding complexity and prediction accuracy to be achieved. The prediction refinement with optical flow (PROF) process is conditionally performed to refine the sub-block based affine motion compensated prediction with optical flow in pixel/sample level granularity. These conditions ensure that the computations involved in the PROF only occur when prediction accuracy can be improved, thereby reducing unnecessary computation complexity increase. Therefore, the beneficial effects achieved by the technology disclosed herein improve the overall compression performance of the coding method.

In a possible implementation form of the method according to the second aspect as such, before the performing a PROF process for a current sub-block of the affine coded block, the method further comprises: determining that the plurality of optical flow decision conditions are fulfilled for the affine coded block.

In a possible implementation form of the method according to the second aspect as such, the plurality of optical flow decision conditions comprises: first indication information indicates that PROF is enabled for a picture containing the affine coded block or first indication information indicates that PROF is enabled for slices associated with a picture containing the affine coded block; and second indication information indicates partition of the affine coded block, such as the variable fallbackModeTriggered is set equal to 0. It can be understood that when the variable fallbackModeTriggered is set equal to 0, partition of the affine coded block is required, that is, each subblock of the affine coded block has a respective Motion vector, which indicates the affine coded block has un-translational motion.

It is allowed that PROF can be applied when all constraints for applying PROF are not fulfilled according to the design of the constraints for applying PROF. Thus, it allows for a trade-off between coding complexity and prediction accuracy.

In a possible implementation form of the method according to any preceding implementation of the second aspect or the second aspect as such, the performing an optical flow processing for the current sub-block to obtain a delta prediction value of a current sample of the current sub-block comprises:

obtaining a second prediction matrix, wherein the elements of the second prediction matrix are based on prediction sample values of the current sub-block; in some examples, the obtaining a second prediction matrix, comprises: generating a first prediction matrix based on motion information of the current sub-block, wherein elements of the first prediction matrix correspond to prediction sample values of the current sub-block, and generating the second prediction matrix based on the first prediction matrix; or generating the second prediction matrix based on the motion information of the current sub-block;

generating a horizontal prediction gradient matrix and a vertical prediction gradient matrix based on the second prediction matrix, wherein a size of the second prediction matrix is greater than or equal to sizes of the horizontal prediction gradient matrix and the vertical prediction gradient matrix; and calculating a delta prediction value ($\Delta I(i,j)$) of a current sample of the current sub-block based on a horizontal prediction gradient value of the current sample in the horizontal prediction gradient matrix, a vertical prediction gradient value of the current sample in the vertical prediction gradient matrix, and a difference between a motion vector of the current sample of the current sub-block and a motion vector of a center sample of the sub-block.

In a possible implementation form of the method according to any preceding implementation of the second aspect or the second aspect as such, further comprising: performing subblock-based affine motion compensation for the current sub-block of the affine coded block, to obtain the (original) prediction sample values of the current sub-block of the affine coded block.

In a possible implementation form of the method according to any preceding implementation of the second aspect or the second aspect as such, a motion vector difference between a motion vector of a current sample unit (for example, a 2×2 sample block) to which the current sample belong and a motion vector of a center sample of the sub-block is used as the difference between the motion vector of the current sample of the current sub-block and the motion vector of the center sample of the sub-block.

In a possible implementation form of the method according to any preceding implementation of the second aspect or the second aspect as such, an element of the second prediction matrix is represented by $I_1(p, q)$, wherein a value range of p is [−1, sbW], and a value range of q is [−1, sbH];

an element of the horizontal prediction gradient matrix is represented by X (i,j) and corresponds to sample (i,j) of the current sub-block in the affine coded block, wherein a value range of i is [0, sbW−1], and a value range of j is [0, sbH−1]; and an element of the vertical prediction gradient matrix is represented by Y (i,j) and corresponds to sample (i,j) of the current sub-block in the affine coded block, wherein a value range of i is [0, sbW−1], and a value range of j is [0, sbH−1]; wherein sbW represents a width of the current sub-block in the affine coded block, sbH represents a height of the current sub-block in the affine coded block.

According to a third aspect, the disclosure relates to an apparatus for prediction refinement with optical flow (PROF) for an affine coded block (i.e., a block encoded or decoded using an affine tool) is provided. The apparatus corresponds to an encoding or decoding apparatus. The apparatus may include:

a determining unit configured for determining that the plurality of constraint conditions for applying PROF are not fulfilled for the affine coded block.

a prediction processing unit configured for performing a PROF process for a current sub-block of the affine coded block to obtain refined prediction sample values (namely, final prediction sample values) of the current sub-block (such as each subblock) of the affine coded block, wherein a plurality of constraint conditions for applying PROF are not fulfilled or satisfied for the affine coded block;

wherein the prediction processing unit is configured for performing an optical flow processing for the current sub-block to obtain a delta prediction value of a current sample of the current sub-block; and obtaining a refined prediction sample value of the current sample based on the delta prediction value of the current sample and a prediction sample value of the current sample of the current sub-block (performing an optical flow processing for the current sub-block to obtain delta prediction values of the current sub-block; and obtaining the refined prediction sample values of the current sub-block based on the delta prediction values of the current sub-block and prediction sample values of the current sub-block). It can be understood that when the refined prediction sample values of each sub-block of the affine coded block are generated, the refined prediction sample values of the affine coded block are naturally generated.

In a possible implementation form of the apparatus according to the third aspect as such, the plurality of constraint conditions for applying PROF comprises: first indication information indicates that PROF is disabled for a picture containing the affine coded block or first indication information indicates that PROF is disabled for slices associated with a picture containing the affine coded block; and second indication information indicates no partition of the affine coded block, i.e. the variable fallbackModeTriggered is set to 1. It can be understood that when the variable fallbackModeTriggered is set to 1, no partition of the affine coded block is required, that is, each subblock of the affine coded block has the same motion vector. This indicates that the affine coded block only has translational motion. When the variable fallbackModeTriggered is set to 0, partition of the affine coded block is required, that is, each subblock of the affine coded block has a respective motion vector. This indicates that the affine coded block has non-translational motion.

In a possible implementation form of the apparatus according to any preceding implementation of the third aspect or the third aspect as such, the prediction processing unit is configured for obtaining a second prediction matrix, (In an example, the second prediction matrix is generated based on a first prediction matrix which corresponds to prediction sample values of the current sub-block. Here, the prediction sample values of the current sub-block may be obtained by performing subblock-based affine motion compensation for the current sub-block.) wherein a size of the second prediction matrix is greater than the size of the first prediction matrix (for example, the first prediction matrix has the size of sbWidth*sbHeight and the second prediction matrix has the size of (sbWidth+2)*(sbHeight+2) and the variables sbWidth and sbHeight represent the width and the height of the current subblock, respectively.); That is, the obtaining a second prediction matrix comprises: generating a first prediction matrix based on motion information of the current sub-block, wherein elements of the first prediction matrix correspond to prediction sample values of the current sub-block, and generating the second prediction matrix based on the first prediction matrix; or generating the second prediction matrix based on the motion information of the current sub-block;

generating a horizontal prediction gradient matrix and a vertical prediction gradient matrix based on the second prediction matrix, wherein a size of the second prediction matrix is greater than or equal to sizes of the horizontal prediction gradient matrix and the vertical prediction gradient matrix; (for example, the horizontal prediction gradient matrix or the vertical prediction gradient matrix has the size of sbWidth*sbHeight and the second prediction matrix has the size of (sbWidth+2)*(sbHeight+2)); and calculating a delta prediction value ($\Delta I(i,j)$) of a current sample of the current sub-block based on a horizontal prediction gradient value of the current sample in the horizontal prediction gradient matrix, a vertical prediction gradient value of the current sample in the vertical prediction gradient matrix, and a difference between a motion vector of the current sample of the current sub-block and a motion vector of a center sample of the sub-block.

In a possible implementation form of the apparatus according to any preceding implementation of the third aspect or the third aspect as such, a motion vector difference between a motion vector of a current sample unit (for example, a 2×2 sample block) containing the current sample and a motion vector of a center sample of the sub-block is used as the difference between the motion vector of the current sample of the current sub-block and the motion vector of the center sample of the sub-block. Here, the motion vector of a center sample of the sub-block can be understood as the MV of the subblock (i.e. the subblock MV) to which the current sample (i,j) belongs. By using the sample unit, such as the 2×2 sample block, to calculate the motion vector difference, it is allowed to balance processing overheads and prediction accuracy. In a possible implementation form of the apparatus according to any preceding implementation of the third aspect or the third aspect as such, an element of the second prediction matrix is represented by $I_1(p, q)$, wherein a value range of p is [−1, sbW], and a value range of q is [−1, sbH];

an element of the horizontal prediction gradient matrix is represented by X (i,j) and corresponds to sample (i,j) of the current sub-block in the affine coded block, wherein a value range of i is [0, sbW−1], and a value range of j is [0, sbH−1]; and an element of the vertical prediction gradient matrix is represented by Y (i,j) and corresponds to sample (i,j) of the current sub-block in the affine coded block, wherein a value range of i is [0, sbW−1], and a value range of j is [0, sbH−1]; wherein sbW represents a width of the current sub-block in the affine coded block, sbH represents a height of the current sub-block in the affine coded block.

In a possible implementation form of the apparatus according to any preceding implementation of the third aspect or the third aspect as such, the prediction processing unit 1503 is configured for performing subblock-based affine motion compensation for the current sub-block of the affine coded block to obtain (original or to-be-refined) prediction sample values of the current sub-block.

According to a fourth aspect of the disclosure, an apparatus for prediction refinement with optical flow (PROF) for an affine coded block is provided, the apparatus may comprises:

a determining unit configured for determining that a plurality of optical flow decision conditions are fulfilled for the affine coded block; Here, the plurality of optical flow decision conditions are fulfilled, means that all constraints for applying PROF are not fulfilled;

a prediction processing unit configured for performing a PROF process for a current sub-block of the affine coded block to obtain refined prediction sample values (namely, final prediction sample values) of the current sub-block of the affine coded block, wherein a plurality of optical flow decision conditions are fulfilled for the affine coded block; wherein the prediction processing unit is configured for performing an optical flow processing for the current sub-block to obtain a delta prediction value of a current sample of the current sub-block; and obtaining a refined prediction sample value of the current sample based on the delta prediction value of the current sample and a (original or to-be-refined) prediction sample value of the current sample of the current sub-block.

In a possible implementation form of the apparatus according to the fourth aspect as such, the plurality of optical flow decision conditions comprises: first indication information indicates that PROF is enabled for a picture containing the affine coded block or first indication information indicates that PROF is enabled for slices associated with a picture containing the affine coded block; and second indication information indicates partition of the affine coded block, such as the variable fallbackModeTriggered is set equal to 0. It can be understood that when the variable fallbackModeTriggered is set equal to 0, partition of the affine coded block is required, that is, each subblock of the affine coded block has a respective Motion vector, which indicates the affine coded block has un-translational motion.

In a possible implementation form of the apparatus according to any preceding implementation of the fourth aspect or the fourth aspect as such, the prediction processing unit is configured for:

obtaining a second prediction matrix, wherein the elements of the second prediction matrix are based on prediction sample values of the current sub-block; in some examples, the obtaining a second prediction matrix, comprises: generating a first prediction matrix based on motion information of the current sub-block, wherein elements of the first prediction matrix correspond to prediction sample values of the current sub-block, and generating the second prediction matrix based on the first prediction matrix; or generating the second prediction matrix based on the motion information of the current sub-block;

generating a horizontal prediction gradient matrix and a vertical prediction gradient matrix based on the second prediction matrix, wherein a size of the second prediction matrix is greater than or equal to sizes of the horizontal prediction gradient matrix and the vertical prediction gradient matrix; and calculating a delta prediction value ($\Delta I(i,j)$) of a current sample of the current sub-block based on a horizontal prediction gradient value of the current sample in the horizontal prediction gradient matrix, a vertical prediction gradient value of the current sample in the vertical prediction gradient matrix, and a difference between a motion vector of the current sample of the current sub-block and a motion vector of a center sample of the sub-block.

In a possible implementation form of the apparatus according to any preceding implementation of the fourth aspect or the fourth aspect as such, the prediction processing unit is configured for performing subblock-based affine motion compensation for the current sub-block of the affine coded block, to obtain the (original) prediction sample values of the current sub-block of the affine coded block.

In a possible implementation form of the apparatus according to any preceding implementation of the fourth aspect or the fourth aspect as such, a motion vector difference between a motion vector of a current sample unit (for example, a 2×2 sample block) to which the current sample belong and a motion vector of a center sample of the sub-block is used as the difference between the motion vector of the current sample of the current sub-block and the motion vector of the center sample of the sub-block.

In a possible implementation form of the apparatus according to any preceding implementation of the fourth aspect or the fourth aspect as such, an element of the second prediction matrix is represented by $I_1(p, q)$, wherein a value range of p is [−1, sbW], and a value range of q is [−1, sbH];

an element of the horizontal prediction gradient matrix is represented by $X(i,j)$ and corresponds to sample (i,j) of the current sub-block in the affine coded block, wherein a value range of i is [0, sbW−1], and a value range of j is [0, sbH−1]; and an element of the vertical prediction gradient matrix is represented by $Y(i,j)$ and corresponds to sample (i,j) of the current sub-block in the affine coded block, wherein a value range of i is [0, sbW−1], and a value range of j is [0, sbH−1]; wherein sbW represents a width of the current sub-block in the affine coded block, sbH represents a height of the current sub-block in the affine coded block.

The method according to the first aspect of the disclosure can be performed by the apparatus according to the third aspect of the disclosure. Further features and implementation forms of the apparatus according to the third aspect of the disclosure correspond to the features and implementation forms of the method according to the first aspect of the disclosure.

The method according to the second aspect of the disclosure can be performed by the apparatus according to the fourth aspect of the disclosure. Further features and implementation forms of the apparatus according to the fourth aspect of the disclosure correspond to the features and implementation forms of the method according to the second aspect of the disclosure.

According to a fifth aspect the disclosure relates to an encoder (20) comprising processing circuitry for carrying out the method according to the first or second aspect as such or the implementation form thereof.

According to a sixth aspect the disclosure relates to a decoder (30) comprising processing circuitry for carrying out the method according to the first or second aspect as such or the implementation form thereof.

According to a seventh aspect the disclosure relates to a decoder. The decoder comprises:
one or more processors; and
a non-transitory computer-readable storage medium coupled to the processors and storing programming for execution by the processors, wherein the programming, when executed by the processors, configures the decoder to carry out the method according to the first aspect as such or the implementation form thereof.

According to an eighth aspect the disclosure relates to an encoder. The encoder comprises:
one or more processors; and
a non-transitory computer-readable storage medium coupled to the processors and storing programming for execution by the processors, wherein the programming, when executed by the processors, configures the encoder to carry out the method according to the first aspect as such or the implementation form thereof.

According to a ninth aspect the disclosure relates to an apparatus for encoding a video stream includes a processor and a memory. The memory is storing instructions that cause the processor to perform the method according to the second aspect.

According to a tenth aspect the disclosure relates to an apparatus for decoding a video stream includes a processor and a memory. The memory is storing instructions that cause the processor to perform the method according to the first aspect.

According to an eleventh aspect, the disclosure relates to a computer program comprising program code for performing the method according to the first or second aspect or any possible embodiment of the first or second aspect when executed on a computer.

According to a twelfth aspect, a computer-readable storage medium having stored thereon instructions that when executed cause one or more processors configured to code video data is proposed. The instructions cause the one or more processors to perform a method according to the first or second aspect or any possible embodiment of the first or second aspect.

According to a further aspect, a video picture encoding method is provided and comprises: determining indication information, wherein the indication information is used to indicate whether a to-be-encoded picture block is to be encoded according to a target inter prediction method, wherein the target inter prediction method comprises the inter prediction method according to the first or second aspect or any possible embodiment of the first or second aspect; and encoding the indication information into a bitstream.

According to a further aspect, a video picture decoding method is provided and comprises: parsing a bitstream, to obtain indication information, wherein the indication information is used to indicate whether a to-be-decoded picture block is to be processed according to a target inter prediction method, wherein the target inter prediction method comprises the inter prediction method according to the first or second aspect or any possible embodiment of the first or second aspect; and processing the to-be-decoded picture block according to the target inter prediction method when the indication information indicates that processing is performed according to the target inter prediction method.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
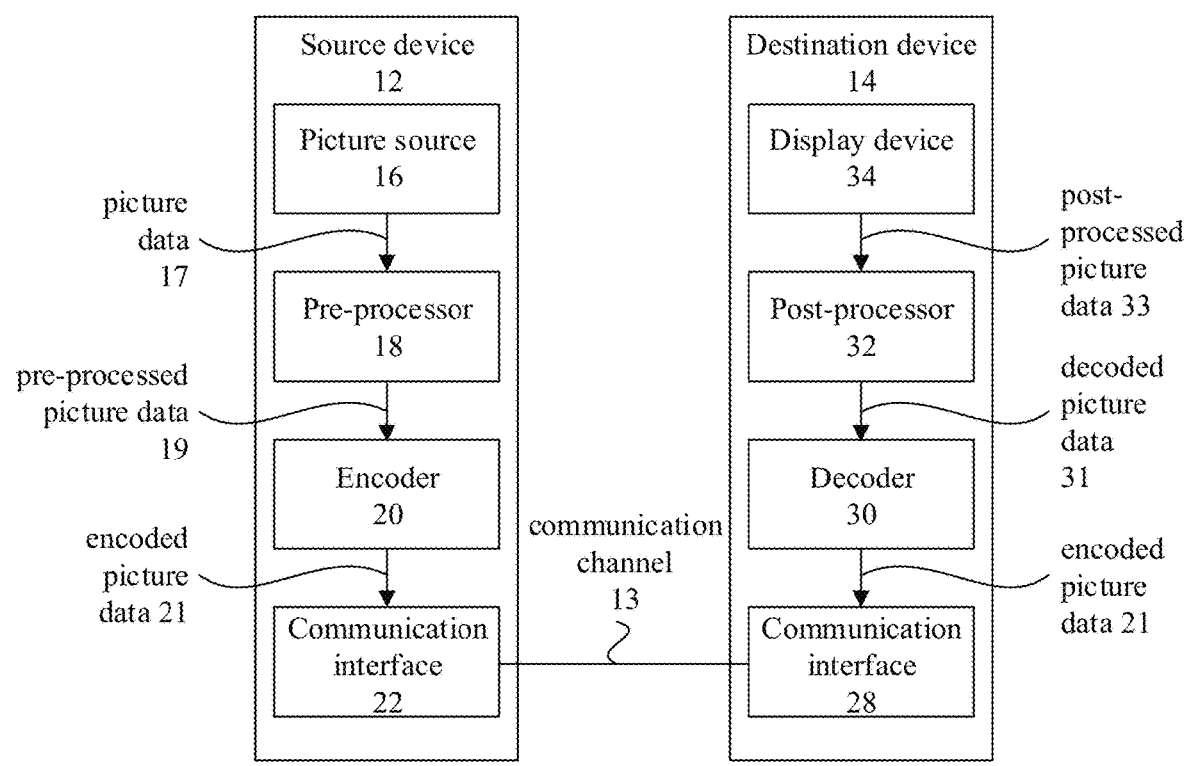
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 21.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
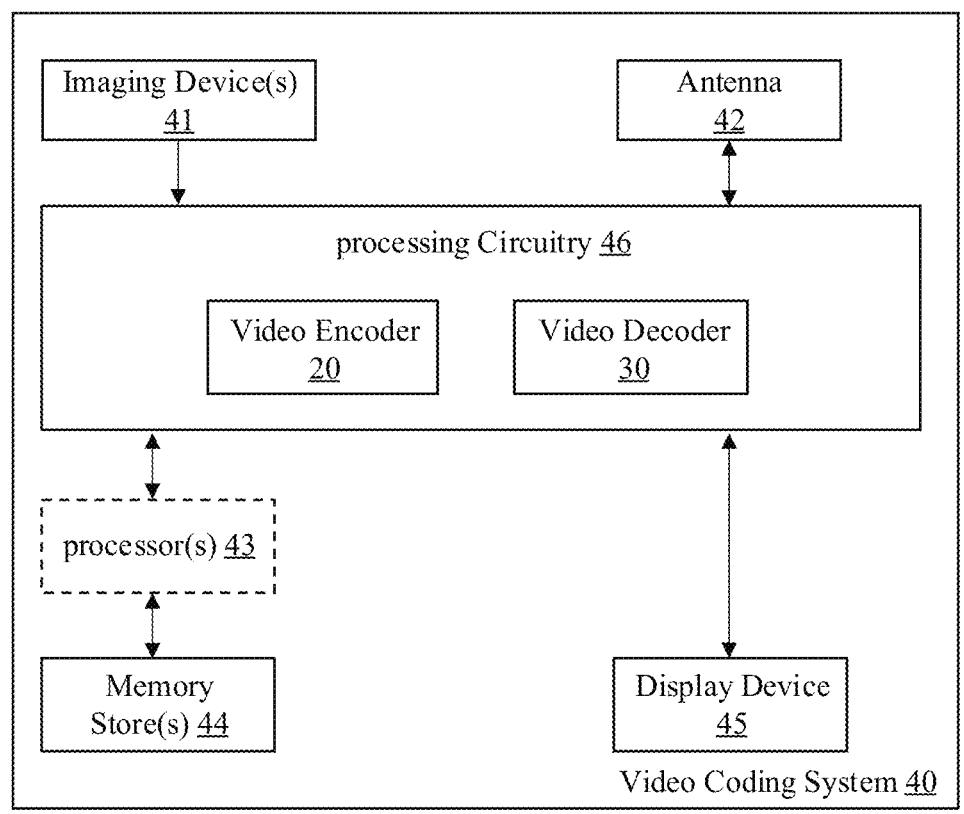
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
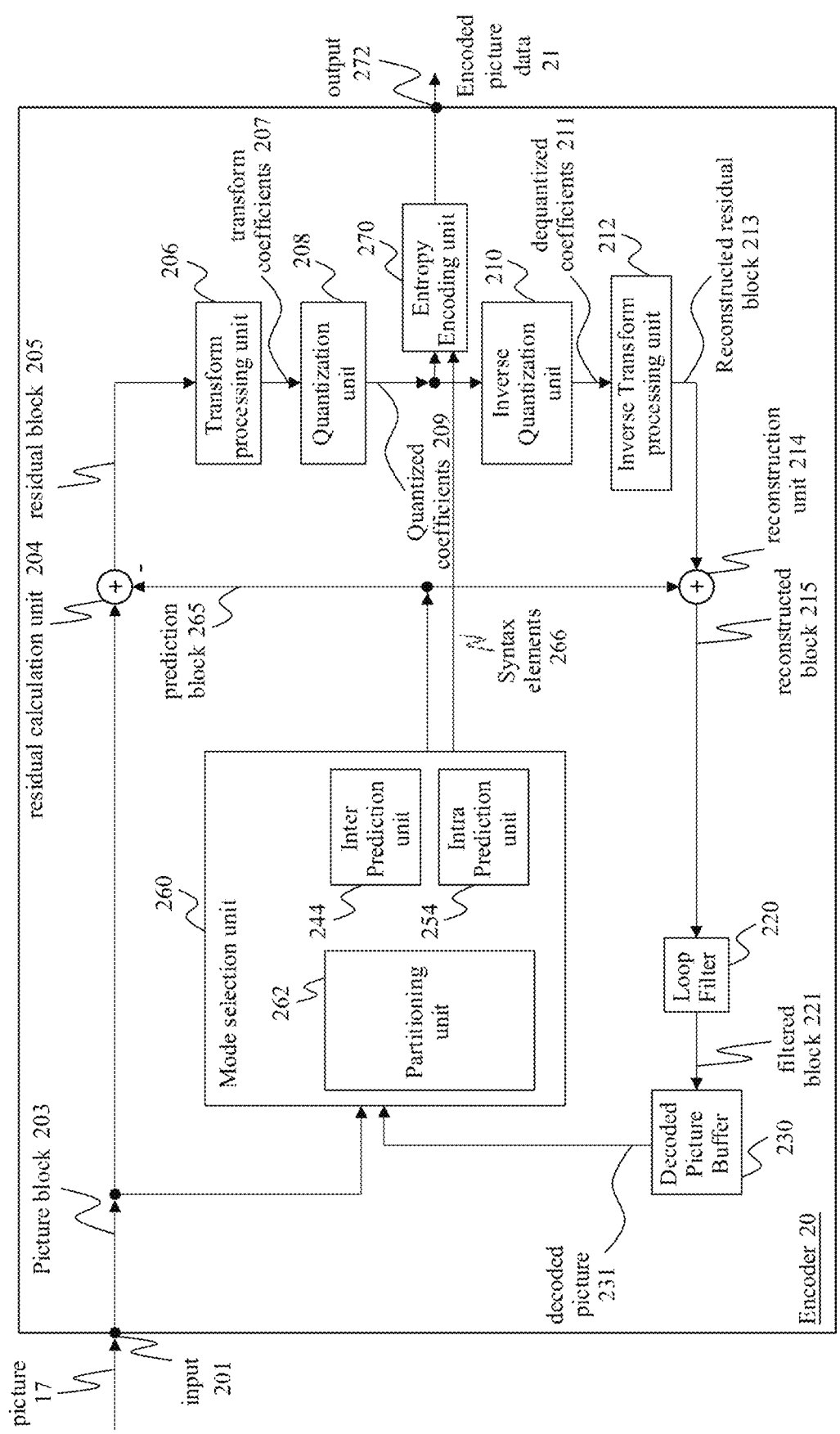
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
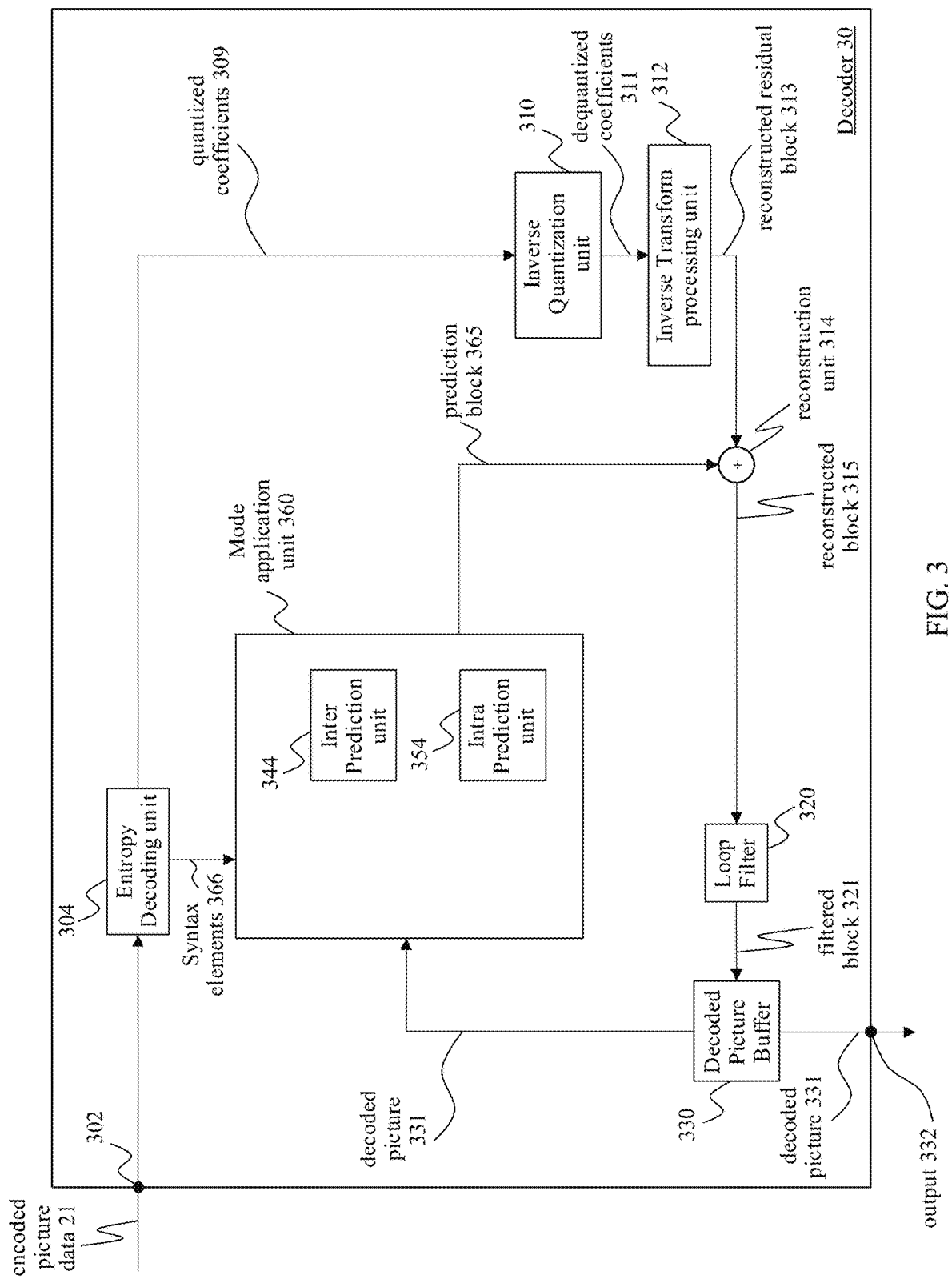
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-sample precision. Interpolation filtering may generate additional samples from known samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decodin. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DPB) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction)

used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(bitDepth-1) \sim 2^{\wedge}(bitDepth-1)-1$, where "^" means exponentiation. For example, if bitDepth is set equal to 16, the range is −32768∼32767; if bitDepth is set equal to 18, the range is −131072∼131071. For example, the value of the derived motion vector (e.g. the MVs of four 4×4 sub-blocks within one 8×8 block) is constrained such that the max difference between integer parts of the four 4×4 sub-block MVs is no more than N samples, such as no more than 1 sample.

Figure 4:
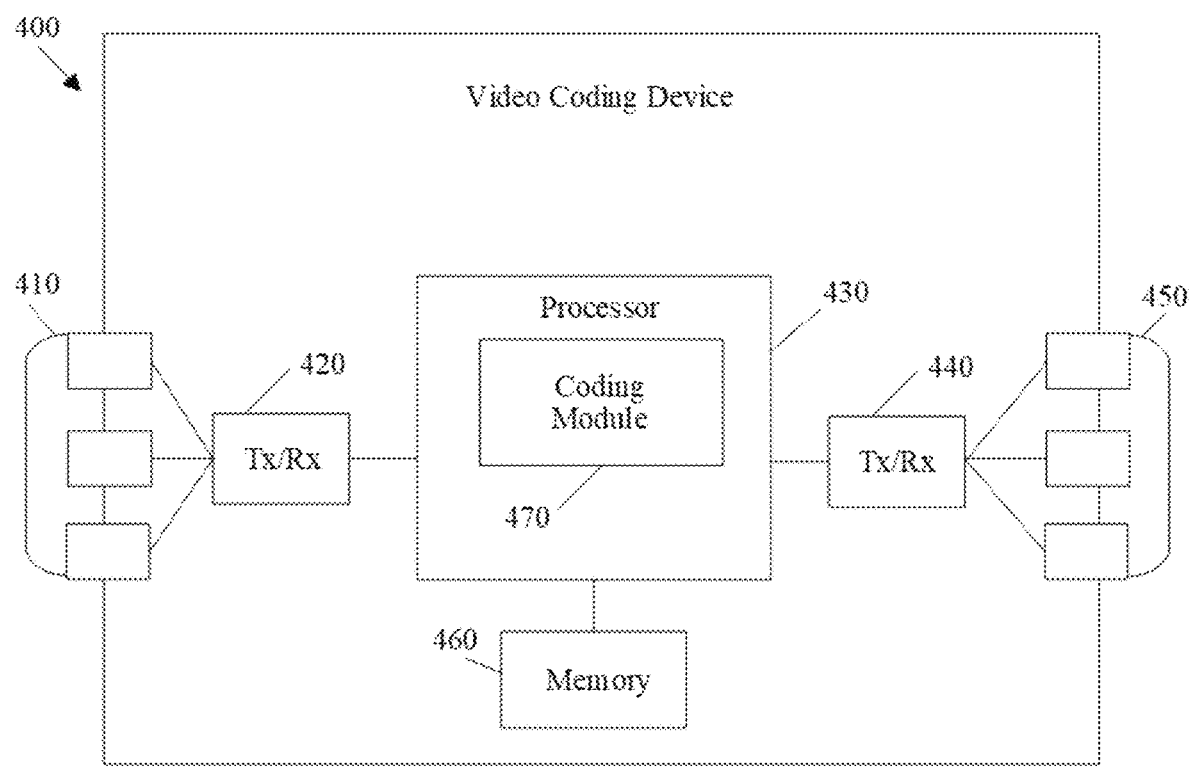
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
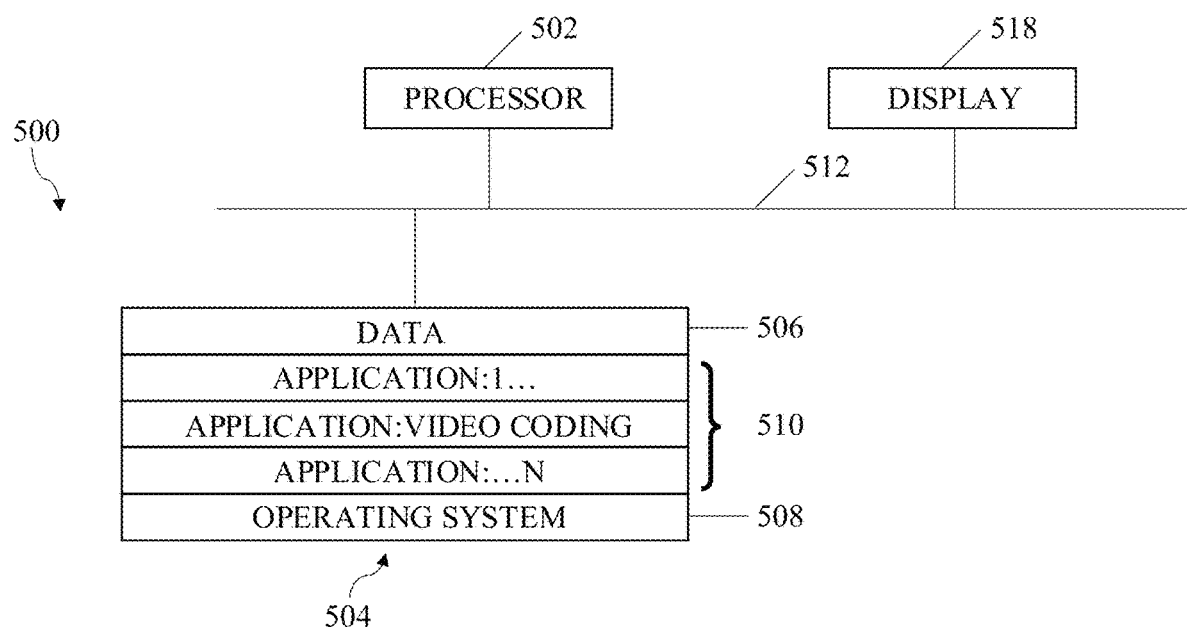
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The following first describes concepts in this application.

1. Inter Prediction Mode

In HEVC, two inter prediction modes are used: an advanced motion vector prediction (advanced motion vector prediction, AMVP) mode and a merge (merge) mode.

In the AMVP mode, spatially or temporally neighboring encoded blocks (denoted as neighboring blocks) of a current block are first traversed; a candidate motion vector list (which may also be referred to as a motion information candidate list) is constructed based on motion information of the neighboring blocks; and then an optimal motion vector is determined from the candidate motion vector list based on a rate-distortion cost. Candidate motion information with a minimum rate-distortion cost is used as a motion vector predictor (MVP) of the current block. Both locations of the neighboring blocks and a traversal order thereof are predefined. The rate-distortion cost is calculated according to formula (1), where J represents the rate-distortion cost (RD cost), SAD is a sum of absolute differences (SAD) between original sample values and predicted sample values obtained through motion estimation by using a candidate motion vector predictor, R represents a bit rate, and X represents a Lagrange multiplier. An encoder side transfers an index value of the selected motion vector predictor in the candidate motion vector list and a reference frame index value to a decoder side. Further, motion search is performed in a neighborhood at the MVP, to obtain an actual motion vector of the current block. The encoder side transfers a difference (motion vector difference) between the MVP and the actual motion vector to the decoder side.

$$J=SAD+\lambda R \quad (1)$$

Figure 6:
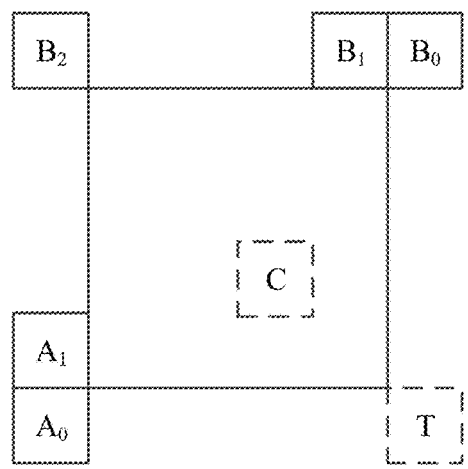
FIG. 6 is a diagram showing spatial and temporal candidate motion information of the current block.

In the merge mode, a candidate motion vector list is first constructed based on motion information of spatially or temporally neighboring encoded blocks of a current block. Then optimal motion information is determined from the candidate motion vector list as motion information of the current block based on a rate-distortion cost. An index value (denoted as a merge index hereinafter) of the location of optimal motion information in the candidate motion vector list is transferred to a decoder side. Spatial and temporal candidate motion information of the current block are shown in FIG. 6. The spatial candidate motion information is from five spatially neighboring blocks (A0, A1, B0, B1, and B2). If a neighboring block is unavailable (the neighboring block does not exist, or the neighboring block is not encoded, or a prediction mode used for the neighboring block is not an inter prediction mode), motion information of this neighboring block is not added to the candidate motion vector list. The temporal candidate motion information of the current block is obtained by scaling an MV of a block at the corresponding location in a reference frame based on picture order counts (POC) of the reference frame and a current frame. Whether a block at a T location in the reference frame is available is first determined, and if the block is unavailable, a block at a C location is selected.

Similar to the AMVP mode, in the merge mode, both locations of the neighboring blocks and a traversal order thereof are also predefined. In addition, the locations of the neighboring blocks and the transversal order thereof may be different in different modes.

It can be learned that, a candidate motion vector list (also referred to as a list of candidates, which may be referred to as a candidate list for short) needs to be maintained in both the AMVP mode and the merge mode. Each time before new motion information is added to a candidate list, whether same motion information already exists in the list is first checked. If the same motion information already exists, the motion information is not added to the list. This checking process is referred to as pruning of the candidate motion vector list. Pruning of the list is to avoid the same motion information to be included in the list, and thereby avoid redundant rate-distortion cost calculation.

In inter prediction in HEVC, same motion information is used for all samples in a coding block, and then motion compensation is performed based on the motion information, to obtain predictors of the samples of the coding block. In the coding block, however, not all samples have same motion characteristics. Using the same motion information for the coding block may result inaccurate motion compensation prediction and more residual information.

In existing video coding standards, block matching motion estimation based on a translational motion model is applied, and it is assumed that motion of all samples in a block is consistent. However, in the real world, there are a variety of motion. Many objects are in non-translational motion, for example, a rotating object, a roller coaster spinning in different directions, a display of fireworks, and some stunts in movies, especially a moving object in a User Generated Content (UGC) scenario. For these moving objects, if a block motion compensation technology based on a translational motion model in the existing coding standards is used for coding, coding efficiency may be greatly affected. As such, a non-translational motion model, for example, an affine motion model, is introduced to further improve the coding efficiency.

Base on this, due to different motion models, the AMVP mode may be classified into a translational model-based AMVP mode and a non-translational model-based AMVP mode (for example, an affine model-based AMVP mode), and the merge mode may be classified into a translational model-based merge mode and a non-translational model-based merge mode (for example, an affine model-based merge mode).

2. Non-Translational Motion Model

Prediction based on a non-translational motion model refers to that, a same motion model is used on both encoder and decoder sides to derive motion information of each sub-block (also referred to as a sub motion compensation unit or a basic motion compensation unit) in a current block, and motion compensation is performed based on the motion information of the sub-block to obtain a prediction block, thereby improving prediction efficiency. Common non-translational motion models include a 4-parameter affine motion model and a 6-parameter affine motion model.

The sub motion compensation unit (also referred to as a sub-block) in this embodiment of this application may be a sample or a $N_1 \times N_2$ sample block obtained based on a particular partitioning method, where both $N_1$ and $N_2$ are positive integers, and $N_1$ may be equal to $N_2$ or may be not equal to $N_2$.

The 4-parameter affine motion model is expressed as formula (2):

$$\begin{cases} vx = a_1 + a_3 x + a_4 y \\ vy = a_2 - a_4 x + a_3 y \end{cases} \quad (2)$$

The 4-parameter affine motion model may be represented by motion vectors of two samples and their coordinates relative to a top-left sample of the current block. A sample used for representing a motion model parameter is referred to as a control point. If the top-left sample (0, 0) and a top-right sample (W, 0) are used as control points, respective motion vectors (vx0, vy0) and (vx1, vy1) of the top-left control point and a top-right control point of the current block are first determined. Then motion information of each sub motion compensation unit of the current block is obtained according to formula (3), where (x, y) is a coordinate (such as a coordinate of a top-left sample) of a sub motion compensation unit relative to the top-left sample of the current block, and W represents a width of the current block. It should be understood that other control points may alternatively be used. For example, samples at locations (2, 2) and (W+2, 2), or (−2, −2) and (W−2, −2) may be used as the control points. The selection of the control points are not limited by the examples listed herein.

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \quad (3)$$

The 6-parameter affine motion model is expressed as formula (4):

$$\begin{cases} vx = a_1 + a_3 x + a_4 y \\ vy = a_2 + a_5 x + a_6 y \end{cases} \quad (4)$$

The 6-parameter affine motion model may be represented by motion vectors of three samples and their coordinates relative to a top-left sample of the current block. If the top-left sample (0, 0), the top-right sample (W, 0), and the bottom-left sample (0, H) of the current block are used as control points, respective motion vectors (vx0,vy0), (vx1, vy1), and (vx2,vy2) of the top-left control point, the top-right control point, and the bottom-left control point of the current block are first determined. Then motion information of each sub motion compensation unit of the current block is obtained according to formula (5), where (x, y) is coordinates of a sub motion compensation unit relative to the top-left sample of the current block, and W and H represent a width and a height of the current block, respectively. It should be understood that other control points may alternatively be used. For example, samples at locations (2, 2), (W+2, 2), and (2, H+2), or (−2, −2), (W−2, −2), and (−2, H−2) may be used as the control points. These examples are not limiting.

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \quad (5)$$

A coding block that is predicted by using the affine motion model is referred to as an affine coded block.

Generally, motion information of a control point of an affine coded block may be obtained by using an affine motion model-based advanced motion vector prediction (AMVP) mode or an affine motion model-based merge mode.

The motion information of the control point of the current coding block may be obtained by using an inherited control point motion vector prediction method or a constructed control point motion vector prediction method.

3. Inherited Control Point Motion Vector Prediction Method

The inherited control point motion vector prediction method refers to using a motion model of a neighboring encoded affine coded block to determine candidate control point motion vectors of a current block.

Figure 7:
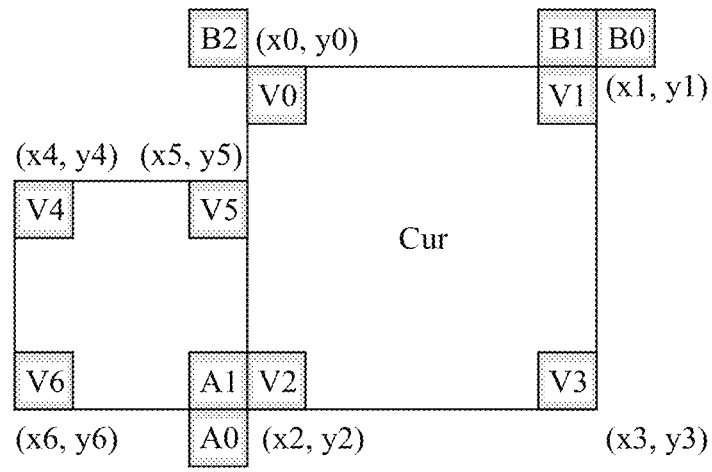
FIG. 7 is a diagram showing a current affine coded block and a neighboring affine coded block in which A1 is located.

A current block shown in FIG. 7 is used as an example. Blocks at neighboring locations around the current block are traversed in a specified order, for example, A1→B1→B0→A0→B2, to find an affine coded block in which a block at a neighboring location of the current block is located, and obtain control point motion information of the affine coded block. Further, a control point motion vector (for the merge mode) or a control point motion vector predictor (for the AMVP mode) of the current block is derived by using a motion model constructed based on the control point motion information of the affine coded block. The order A1→B1→B0→A0→B2 mentioned above is merely used as an example and should not be construed as limiting. Another order can also be used. In addition, the blocks at neighboring locations are not limited to A1, B1, B0, A0, and B2 and various block at neighboring locations can be used.

A block at a neighboring location may a sample or a sample block of a preset size obtained based on a particular partitioning method. For example, the sample block may be a 4×4 sample block, a 4×2 sample block, or a sample block of another size. These block sizes are for illustration purposes and should not be construed as limiting.

The following describes a determining process by using A1 as an example, and similar process can be employed for other cases.

As shown in FIG. 7, if a coding block in which A1 is located is a 4-parameter affine coded block, the motion vector (vx4, vy4) of the top-left sample (x4, y4) and the motion vector (vx5, vy5) of the top-right sample (x5, y5) of the affine coded block are obtained. The motion vector (vx0, vy0) of the top-left sample (x0, y0) of the current affine coded block is calculated according to formula (6), and the motion vector (vx1, vy1) of the top-right sample (x1, y1) of the current affine coded block is calculated according to formula (7).

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vy_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases} \quad (6)$$

$$\begin{cases} vx_1 = vx_4 + \dfrac{(vx_5 - vx_4)}{x_5 - x_4} \times (x_1 - x_4) - \dfrac{(vy_5 - vy_4)}{x_5 - x_4} \times (y_1 - y_4) \\ vy_1 = vy_4 + \dfrac{(vy_5 - vy_4)}{x_5 - x_4} \times (x_1 - x_4) + \dfrac{(vx_5 - vx_4)}{x_5 - x_4} \times (y_1 - y_4) \end{cases} \quad (7)$$

A combination of the motion vector (vx0, vy0) of the top-left sample (x0, y0) and the motion vector (vx1, vy1) of the top-right sample (x1, y1) of the current block that are obtained based on the affine coded block in which A1 is located is the candidate control point motion vectors of the current block.

If a coding block in which A1 is located is a 6-parameter affine coded block, the motion vector (vx4, vy4) of the top-left sample (x4, y4), the motion vector (vx5, vy5) of the top-right sample (x5, y5), and the motion vector (vx6, vy6) of the bottom-left sample (x6, y6) of the affine coded block are obtained. The motion vector (vx0, vy0) of the top-left sample (x0, y0) of the current block is calculated according to formula (8). The motion vector (vx1, vy1) of the top-right sample (x1, y1) of the current block is calculated according to formula (9). The motion vector (vx2, vy2) of the bottom-left sample (x2, y2) of the current block is calculated according to formula (10).

$$\begin{cases} vx_0 = vx_4 + \frac{(vx_5 - vx_4)}{x_5 - x_4} \times (x_0 - x_4) - \frac{(vx_6 - vx_4)}{y_6 - y_4} \times (y_0 - y_4) \\ vy_0 = vy_4 + \frac{(vy_5 - vy_4)}{x_5 - x_4} \times (x_0 - x_4) + \frac{(vy_6 - vy_4)}{y_6 - y_6} \times (y_0 - y_4) \end{cases} \quad (8)$$

$$\begin{cases} vx_1 = vx_4 + \frac{(vx_5 - vx_4)}{x_5 - x_4} \times (x_1 - x_4) - \frac{(vx_6 - vx_4)}{y_6 - y_4} \times (y_1 - y_4) \\ vy_1 = vy_4 + \frac{(vy_5 - vy_4)}{x_5 - x_4} \times (x_1 - x_4) + \frac{(vy_6 - vy_4)}{y_6 - y_6} \times (y_1 - y_4) \end{cases} \quad (9)$$

$$\begin{cases} vx_2 = vx_4 + \frac{(vx_5 - vx_4)}{x_5 - x_4} \times (x_2 - x_4) - \frac{(vx_6 - vx_4)}{y_6 - y_4} \times (y_2 - y_4) \\ vy_2 = vy_4 + \frac{(vy_5 - vy_4)}{x_5 - x_4} \times (x_2 - x_4) + \frac{(vy_6 - vy_4)}{y_6 - y_6} \times (y_2 - y_4) \end{cases} \quad (10)$$

A combination of the motion vector (vx0, vy0) of the top-left sample (x0, y0), the motion vector (vx1, vy1) of the top-right sample (x1, y1), and the motion vector (vx2, vy2) of the bottom-left sample (x2, y2) of the current block that are obtained based on the affine coded block in which A1 is located is the candidate control point motion vector of the current block.

It should be noted that other motion models, candidate locations, and search and traversal orders are also applicable to this application. Details are not described in this embodiment of this application.

It should be noted that methods in which other control points are used to represent motion models of neighboring and current coding blocks are also applicable to this application. Details are not described herein.

4. Constructed Control Point Motion Vectors Prediction Method 1

The constructed control point motion vector prediction method refers to combining motion vectors of neighboring encoded blocks around a control point of a current block as a control point motion vector of a current affine coded block, without considering whether the neighboring encoded blocks are affine coded blocks.

Figure 8A:
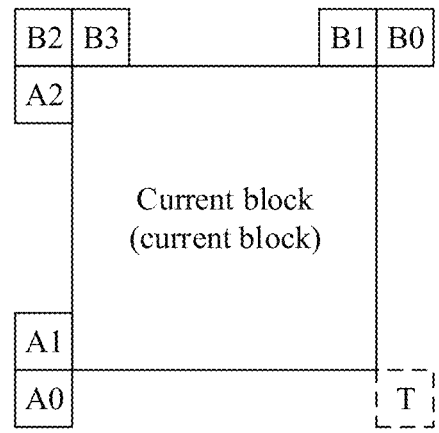
FIG. 8A is a diagram showing an example to describe the constructed control point motion vector prediction method.

Motion vectors of the top-left sample and the top-right sample of the current block are determined by using motion information of the neighboring encoded blocks around the current coding block. FIG. 8A is used as an example to describe the constructed control point motion vector prediction method. It should be noted that FIG. 8A is merely an example and should not be construed as limiting.

As shown in FIG. 8A, motion vectors of neighboring encoded blocks A2, B2, and B3 of the top-left sample are used as candidate motion vectors for the motion vector of the top-left sample of the current block, and motion vectors of neighboring encoded blocks B1 and B0 of the top-right sample are used as candidate motion vectors for the motion vector of the top-right sample of the current block. The candidate motion vectors of the top-left sample and the top-right sample are combined to constitute a plurality of 2-tuples. Motion vectors of two encoded blocks included in a 2-tuple may be used as candidate control point motion vectors of the current block, as shown in the following formula (11A):

$$\{v_{A2}, v_{B1}\}, \{v_{A2}, v_{B0}\}, \{v_{B2}, v_{B1}\}, \{v_{B2}, v_{B0}\}, \{v_{B3}, v_{B1}\}, \\ \{v_{B3}, v_{B0}\} \quad (A)$$

where $v_{A2}$ represents a motion vector of A2, $v_{B1}$ represents a motion vector of B1, $v_{B0}$ represents a motion vector of B0, $v_{B2}$ represents a motion vector of B2, and $v_{B3}$ represents a motion vector of B3.

As shown in FIG. 8A, motion vectors of neighboring encoded blocks A2, B2, and B3 of the top-left sample are used as candidate motion vectors for the motion vector of the top-left sample of the current block, motion vectors of neighboring encoded blocks B1 and B0 of the top-right sample are used as candidate motion vectors for the motion vector of the top-right sample of the current block, and motion vectors of neighboring encoded blocks A0 and A1 of the bottom-left sample are used as candidate motion vectors for the motion vector of the bottom-left sample of the current block. The candidate motion vectors of the top-left sample, the top-right sample, and the bottom-left sample are combined to constitute a 3-tuple. Motion vectors of three encoded blocks included in a 3-tuple may be used as candidate control point motion vectors of the current block, as shown in the following formulas (11B) and (11C):

$$\{v_{A2}, v_{B1}, v_{A0}\}, \{v_{A2}, v_{B0}, v_{A0}\}, \{v_{B2}, v_{B1}, v_{A0}\}, \{v_{B2}, v_{B0}, \\ v_{A0}\}, \{v_{B3}, v_{B1}, v_{A0}\}, \{v_{B3}, v_{B0}, v_{A0}\} \quad (11B)$$

$$\{v_{A2}, v_{B1}, v_{A1}\}, \{v_{A2}, v_{B0}, v_{A1}\}, \{v_{B2}, v_{B1}, v_{A1}\}, \{v_{B2}, v_{B0}, \\ v_{A1}\}, \{v_{B3}, v_{B1}, v_{A1}\}, \{v_{B3}, v_{B0}, v_{A1}\} \quad (11C)$$

where $v_{A2}$ represents a motion vector of A2, $v_{B1}$ represents a motion vector of B1, $v_{B0}$ represents a motion vector of B0, $v_{B2}$ represents a motion vector of B2, $v_{B3}$ represents a motion vector of B3, $v_{A0}$ represents a motion vector of A0, and vA1 represents a motion vector of A1.

It should be noted that other methods for combining control point motion vectors are also applicable to this application. Details are not described herein.

It should be noted that methods in which other control points are used to represent motion models of neighboring and current coding blocks are also applicable to this application. Details are not described herein.

Figure 8B:
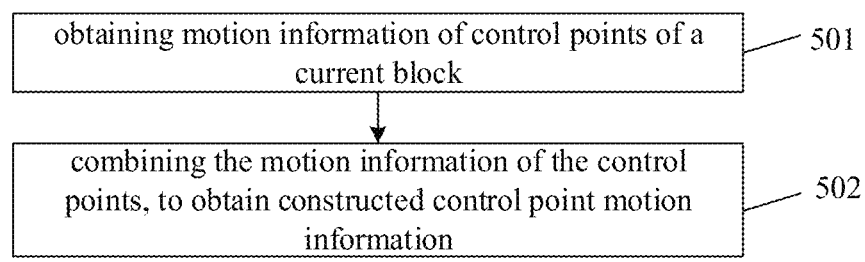
FIG. 8B is a diagram showing an example to describe the constructed control point motion vector prediction method.

5. Constructed Control Point Motion Vectors Prediction Method 2, as Shown in FIG. 8B:

Step 501: Obtaining motion information of control points of a current block.

For example, in FIG. 8A, $CP_k$ (k=1, 2, 3, 4) represents a $k^{th}$ control point. A0, A1, A2, B0, B1, B2, and B3 are spatially neighboring locations of the current block and are used to predict CP1, CP2, or CP3, and T is a temporally neighboring location of the current block and is used to predict CP4.

It is assumed that coordinates of CP1, CP2, CP3, and CP4 are (0, 0), (W, 0), (H, 0), and (W, H), respectively, where W and H represent a width and a height of the current block.

For each control point, motion information thereof is obtained in the following order:

(1) For CP1, a check order is B2→A2→B3. If B2 is available, motion information of B2 is used for CP1. Otherwise, A2 and B3 are checked sequentially. If motion information of all the three locations is unavailable, motion information of CP1 cannot be obtained.

(2) For CP2, a check order is B0→B1. If B0 is available, motion information of B0 is used for CP2. Otherwise, B1 is checked. If motion information of both the locations is unavailable, motion information of CP2 cannot be obtained.

(3) For CP3, a check order is A0→A1. If A0 is available, motion information of A0 is used for CP3. Otherwise, A1 is checked. If motion information of both the locations is unavailable, motion information of CP3 cannot be obtained.

(4) For CP4, motion information of T is used.

Herein, that X is available means that the block X (e.g., A0, A1, A2, B0, B1, B2, B3, or T) is already encoded and an inter prediction mode is used. Otherwise, X is unavailable.

It should be noted that other methods for obtaining motion information of a control point are also applicable to this application. Details are not described herein.

Step 502: Combining the motion information of the control points, to obtain constructed control point motion information.

Motion information of two control points is combined to constitute a 2-tuple, to construct a 4-parameter affine motion model. Combinations of motion information of the two control points may be {CP1, CP4}, {CP2, CP3}, {CP1, CP2}, {CP2, CP4}, {CP1, CP3}, and {CP3, CP4}. For example, a 4-parameter affine motion model constructed by using a 2-tuple including motion information of the control points CP1 and CP2 may be denoted as Affine (CP1, CP2).

Motion information of three control points is combined to constitute a 3-tuple, to construct a 6-parameter affine motion model. Combinations of motion information of the three control points may be {CP1, CP2, CP4}, {CP1, CP2, CP3}, {CP2, CP3, CP4}, and {CP1, CP3, CP4}. For example, a 6-parameter affine motion model constructed by using a 3-tuple including motion information of the control points CP1, CP2, and CP3 may be denoted as Affine (CP1, CP2, CP3).

Motion information of four control points is combined to constitute a 4-tuple, to construct an 8-parameter bilinear motion model. An 8-parameter bilinear motion model constructed by using a 4-tuple including motion information of the control points CP1, CP2, CP3, and CP4 may be denoted as Bilinear (CP1, CP2, CP3, CP4).

In this embodiment of this application, for ease of description, a combination of motion information of two control points (or two encoded blocks) is simply referred to as a 2-tuple, a combination of motion information of three control points (or three encoded blocks) is simply referred to as a 3-tuple, and a combination of motion information of four control points (or four encoded blocks) is simply referred to as a 4-tuple.

These models are traversed in a preset order. If motion information of a control point corresponding to a combination model is unavailable, it is considered that the model is unavailable. Otherwise, a reference frame index of the model is determined, and a control point motion vector is scaled. If motion information of all control points after scaling is consistent, the model is invalid. If all motion information of control points controlling the model is available and the model is valid, motion information of the control points constructing the model is added to a motion information candidate list.

A control point motion vector scaling method is shown in formula (12):

$$MV_s = \frac{CurPoc - DesPoc}{CurPoc - SrcPoc} \times MV \quad (12)$$

where CurPoc represents the POC number of a current frame, DesPoc represents the POC number of a reference frame of the current block, SrcPoc represents the POC number of a reference frame of a control point, MVs represents the motion vector obtained after scaling, and MV represents the motion vector of a control point.

It should be noted that a combination of different control points may be converted into control points at a same location.

For example, a 4-parameter affine motion model obtained through a combination {CP1, CP4}, {CP2, CP3}, {CP2, CP4}, {CP1, CP3}, or {CP3, CP4} is converted into a representation by {CP1, CP2} or {CP1, CP2, CP3}. The conversion method includes: substituting the motion vectors and coordinate information of the control points {CP1, CP4}, {CP2, CP3}, {CP2, CP4}, {CP1, CP3}, or {CP3, CP4} into formula (2) to obtain the model parameters; and then substituting coordinate information of {CP1, CP2} into formula (3), to obtain a motion vector of the control points{CP1, CP2}.

More directly, conversion may be performed according to the following formulas (13) to (21), where W represents the width of the current block, and H represents the height of the current block. In formulas (13) to (21), $(vx_0, vy_0)$ represents a motion vector of CP1, $(vx_1, vy_1)$ represents a motion vector of CP2, $(vx_2, vy_2)$ represents a motion vector of CP3, and $(vx_3, vy_3)$ represents a motion vector of CP4.

{CP1, CP2} may be converted into {CP1, CP2, CP3} by using the following formula (13). In other words, the motion vector of CP3 in {CP1, CP2, CP3} may be determined by using formula (13):

$$\begin{cases} vx_2 = -\frac{vy_1 - vy_0}{W}H + vx_0 \\ vy_2 = +\frac{vx_1 - vx_0}{W}H + vy_0 \end{cases} \quad (13)$$

{CP1, CP3} may be converted into {CP1, CP2} or {CP1, CP2, CP3} by using the following formula (14):

$$\begin{cases} vx_1 = +\frac{vy_2 - vy_0}{H}W + vx_0 \\ vy_1 = -\frac{vx_2 - vx_0}{H}W + vy_0 \end{cases} \quad (14)$$

{CP2, CP3} may be converted into {CP1, CP2} or {CP1, CP2, CP3} by using the following formula (15):

$$\begin{cases} vx_0 = \frac{vx_2 - vx_1}{W*W + H*H}W*W - \frac{vy_2 - vy_1}{W*W + H*H}H*W + vx_1 \\ vy_0 = \frac{vy_2 - vy_1}{W*W + H*H}W*W + \frac{vx_2 - vx_1}{W*W + H*H}H*W + vy_1 \end{cases} \quad (15)$$

{CP1, CP4} may be converted into {CP1, CP2} or {CP1, CP2, CP3} by using the following formula (16) or (17):

$$\begin{cases} vx_1 = \frac{vx_3 - vx_0}{W*W + H*H}W*W + \frac{vy_3 - vy_0}{W*W + H*H}H*W + vx_0 \\ vy_1 = \frac{vy_3 - vy_0}{W*W + H*H}W*W - \frac{vx_3 - vx_0}{W*W + H*H}H*W + vy_0 \end{cases} \quad (16)$$

-continued $$\begin{cases} vx_2 = \dfrac{vx_3 - vx_0}{W*W + H*H}H*H - \dfrac{vy_3 - vy_0}{W*W + H*H}H*W + vx_0 \\ vy_2 = \dfrac{vy_3 - vy_0}{W*W + H*H}W*H + \dfrac{vx_3 - vx_0}{W*W + H*H}H*H + vy_0 \end{cases} \quad (17)$$

{CP2, CP4} may be converted into {CP1, CP2} by using the following formula (18), and {CP2, CP4} may be converted into {CP1, CP2, CP3} by using the following formulas (18) and (19):

$$\begin{cases} vx_0 = -\dfrac{vy_3 - vy_1}{H}W + vx_1 \\ vy_0 = +\dfrac{vx_3 - vx_1}{H}W + vy_1 \end{cases} \quad (18)$$

$$\begin{cases} vx_2 = -\dfrac{vy_3 - vy_1}{H}W + vx_3 \\ vy_2 = +\dfrac{vx_3 - vx_1}{H}W + vy_3 \end{cases} \quad (19)$$

{CP3, CP4} may be converted into {CP1, CP2} by using the following formula (20), and {CP3, CP4} may be converted into {CP1, CP2, CP3} by using the following formulas (20) and (21):

$$\begin{cases} vx_0 = +\dfrac{vy_3 - vy_2}{W}H + vx_2 \\ vy_0 = -\dfrac{vx_3 - vx_2}{W}H + vy_2 \end{cases} \quad (20)$$

$$\begin{cases} vx_1 = +\dfrac{vy_3 - vy_2}{W}H + vx_3 \\ vy_1 = -\dfrac{vx_3 - vx_2}{W}H + vy_3 \end{cases} \quad (21)$$

For example, a 6-parameter affine motion model obtained through a combination {CP1, CP2, CP4}, {CP2, CP3, CP4}, or {CP1, CP3, CP4} can be converted into a representation by {CP1, CP2, CP3}. The conversion method includes: substituting a motion vector and coordinate information of the control points {CP1, CP2, CP4}, {CP2, CP3, CP4}, or {CP1, CP3, CP4} into formula (4), to obtain a model parameter; and then substituting coordinate information of {CP1, CP2, CP3} into formula (5), to obtain the motion vectors of {CP1, CP2, CP3}.

More directly, conversion may be performed according to the following formulas (22) to (24), where W represents the width of the current block, and H represents the height of the current block. In the formulas (13) to (21), ($vx_0$, $vy_0$) represents a motion vector of CP1, ($vx_1$, $vy_1$) represents a motion vector of CP2, ($vx_2$, $vy_2$) represents a motion vector of CP3, and ($vx_3$, $vy_3$) represents a motion vector of CP4.

{CP1, CP2, CP4} may be converted into {CP1, CP2, CP3} by using the following formula (22):

$$\begin{cases} vx_2 = vx_3 + vx_0 - vx_1 \\ vy_2 = vy_3 + vy_0 - vy_1 \end{cases} \quad (22)$$

{CP2, CP3, CP4} may be converted into {CP1, CP2, CP3} by using the following formula (23):

$$\begin{cases} vx_0 = vx_1 + vx_2 - vx_3 \\ vy_0 = vy_1 + vy_2 - vy_3 \end{cases} \quad (23)$$

{CP1, CP3, CP4} may be converted into {CP1, CP2, CP3} by using the following formula (24):

$$\begin{cases} vx_1 = vx_3 + vx_0 - vx_2 \\ vy_1 = vy_3 + vy_0 - vy_2 \end{cases} \quad (24)$$

6. Affine Motion Model-Based Advanced Motion Vector Prediction Mode (Affine AMVP Mode)

(1) Constructing a Candidate Motion Vector List

A candidate motion vector list for the affine motion model-based AMVP mode is constructed by using the inherited control point motion vector prediction method and/or the constructed control point motion vector prediction method described above. In this embodiment of this application, the candidate motion vector list for the affine motion model-based AMVP mode may be referred to as a control point motion vector predictor candidate list. The motion vector predictor of each control point includes motion vectors of two (4-parameter affine motion model) control points or motion vectors of three (6-parameter affine motion model) control points.

Optionally, the control point motion vector predictor candidate list is pruned and sorted according to a particular rule, and may be truncated or padded to include a particular quantity of control point motion vector predictors candidate.

(2) Determining an Optimal Control Point Motion Vector Predictors Candidate

On an encoder side, the motion vector of each sub motion compensation unit in the current coding block is obtained based on each control point motion vector predictors candidate (e.g. a X-tuple candidate) in the control point motion vector predictor candidate list by using formula (3) or (5). The obtained motion vector can be used to obtain a sample value at a corresponding location in a reference frame to which the motion vector of the sub motion compensation unit points. This sample value is used as a predictor to perform motion compensation using the affine motion model. An average difference between an original value and a prediction value of each sample in the current coding block is calculated. A control point motion vector predictors candidate corresponding to the minimum average difference is selected as the optimal control point motion vector predictors candidate, and used as motion vector predictors of two or three control points of the current coding block. An index number representing the location of the optimal control point motion vector predictors candidate (e.g. a X-tuple candidate) in the control point motion vector predictors candidate list is encoded into a bitstream and sent to a decoder.

On a decoder side, the index number is parsed, and the control point motion vector predictors (CPMVPs) (e.g. X-tuple candidate) are determined from the control point motion vector predictor candidate list based on the index number.

(3) Determining Control Point Motion Vectors

On the encoder side, the control point motion vector predictor is used as a search start point for motion search within a specific search range, to obtain control point motion vectors (CPMVs). The differences (control point motion vectors differences, CPMVDs) between the respective control point motion vectors and the control point motion vector predictors are transferred to the decoder side.

On the decoder side, the control point motion vector differences are obtained by parsing the bit stream and added to the control point motion vector predictors respectively, to obtain the respective control point motion vectors.

7. Affine Merge Mode

A control point motion vectors merge candidate list is constructed by using the inherited control point motion vector prediction method and/or the constructed control point motion vector prediction method described above.

Optionally, the control point motion vectors merge candidate list is pruned and sorted according to a particular rule, and may be truncated or padded to a particular quantity.

On the encoder side, a motion vector of each sub motion compensation unit (a sample or a $N_1 \times N_2$ sample block obtained based on a particular partitioning method) in the current coding block is obtained based on each control point motion vectors candidate (e.g. X-tuple candidate) in the merge candidate list by using formula ((3) or (5). The obtained motion vector can be used to obtain sample values at a location in a reference frame to which the motion vector of each sub motion compensation unit points. These sample values are used as predicted sample values to perform affine motion compensation. An average difference between an original value and a predicted value of each sample in the current coding block is calculated. The control point motion vectors (CPMVs) candidate (e.g. 2-tuple candidate or 3-tuple candidate) corresponding to a minimum average difference is selected as motion vectors of two or three control points of the current coding block. An index number representing the location of the control point motion vector in the candidate list is encoded into the bitstream of the video and sent to the decoder.

On the decoder side, the index number is parsed, and the control point motion vectors (CPMVs) are determined from the control point motion vector merge candidate list based on the index number.

In addition, it should be noted that in this application, "at least one" means one or more, and "a plurality of" means at least two. The term "and/or" describes an association relationship for describing associated objects and represents that three relationships may exist. For example, A and/or B may represent the following cases: Only A exists, both A and B exist, and only B exists, where A and B may be in a singular or plural form. The character "/" generally indicates an "or" relationship between the associated objects. "At least one (one piece) of the following [items]" or a similar expression refers to any combination of these items, including any combination of singular items (pieces) or plural items (pieces). For example, at least one (one piece) of a, b, or c may represent: a, b, c, a and b, a and c, b and c, or a and b and c, where a, b, and c may be singular or plural.

In this application, when the inter prediction mode is used to decode the current block, a syntax element may be used to signal the inter prediction mode.

For some currently used syntax structures of the inter prediction mode used for parsing the current block, refer to Table 1 where some syntaxes for the inter prediction mode are listed. A syntax element in a syntax structure may be alternatively represented by other identifiers.

TABLE 1

| coding_unit( x0, y0, cbWidth, cbHeight, treeType ) { | Descriptor |
|---|---|
|   if( cu_skip_flag[ x0 ][ y0 ] = = 0) | |
|     merge_flag[ x0 ][ y0 ] | ae(v) |
|   if( merge_flag[ x0 ][ y0 ] ) { | |
|     merge_data( x0, y0, cbWidth, cbHeight ) | |
|   } else if ( CuPredMode[ x0 ][ y0 ] = = MODE_IBC ) { | |
|     mvd_coding( x0, y0, 0, 0 ) | |
|     mvp_l0_flag[ x0 ][ y0 ] | ae(v) |
|     if( sps_amvr_enabled_flag && | |
|       ( MvdL0[ x0 ][ y0 ][ 0 ] != 0 \|\| MvdL0[ x0 ][ y0 ][ 1 ] != 0 ) ) { | |
|       amvr_precision_flag[ x0 ][ y0 ] | ae(v) |
|     } | |
|   } else { | |
|     if( tile_group_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( inter_pred_idc[ x0 ][ y0 ] = = PRED_BI && !inter_affine_flag[ x0 ][ y0 ] && | |
|       RefIdxSymL0 > −1 && RefIdxSymL1 > −1 ) | |
|       sym_mvd_flag[ x0 ][ y0 ] | ae(v) |
|     if( inter_pred_idc[ x0 ][ y0 ] != PRED_L1 ) { | |
|       if( NumRefIdxActive[ 0 ] > 1 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( NumRefIdxActive[ 1 ] > 1 && !sym_mvd_flag[ x0 ][ y0 ] ) | |
|         ref_idx_l1[ x0 ][ y0 ] | ae(v) |
|       if( mvd_l1_zero_flag && inter_pred_idc[ x0 ][ y0 ] = = PRED_BI ) { | |
|         MvdL1[ x0 ][ y0 ][ 0 ] = 0 | |

TABLE 1-continued

| coding_unit( x0, y0, cbWidth, cbHeight, treeType ) { | Descriptor |
|---|---|
|       MvdL1[ x0 ][ y0 ][ 1 ] = 0 | |
|       MvdCpL1[ x0 ][ y0 ][ 0 ][ 0 ] = 0 | |
|       MvdCpL1[ x0 ][ y0 ][ 0 ][ 1 ] = 0 | |
|       MvdCpL1[ x0 ][ y0 ][ 1 ][ 0 ] = 0 | |
|       MvdCpL1[ x0 ][ y0 ][ 1 ][ 1 ] = 0 | |
|       MvdCpL1[ x0 ][ y0 ][ 2 ][ 0 ] = 0 | |
|       MvdCpL1[ x0 ][ y0 ][ 2 ][ 1 ] = 0 | |
|    } else { | |
|      if( sym_mvd_flag[ x0 ][ y0 ] ) { | |
|        MvdL1[ x0 ][ y0 ][ 0 ] = −MvdL0[ x0 ][ y0 ][ 0 ] | |
|        MvdL1[ x0 ][ y0 ][ 1 ] = −MvdL0[ x0 ][ y0 ][ 1 ] | |
|      } else | |
|        mvd_coding( x0, y0, 1, 0 ) | |
|      if( MotionModelIdc[ x0 ][ y0 ] > 0 ) | |
|        mvd_coding( x0, y0, 1, 1 ) | |
|      if(MotionModelIdc[ x0 ][ y0 ] > 1 ) | |
|        mvd_coding( x0, y0, 1, 2 ) | |
|      mvp_l1_flag[ x0 ][ y0 ] | ae(v) |
|    } | |
|  } else { | |
|    MvdL1[ x0 ][ y0 ][ 0 ] = 0 | |
|    MvdL1[ x0 ][ y0 ][ 1 ] = 0 | |
|  } | |
|  ...... | |
|    } | |
|  } | |
|  ...... | |
|  } | |
| } | |

In Table 1, inter_affine_flag[x0][y0] equal to 1 specifies that for the current coding unit, when decoding a P or B tile group, affine model based motion compensation is used to generate the prediction samples of the current coding unit. inter_affine_flag[x0][y0] equal to 0 specifies that the coding unit is not predicted by affine model based motion compensation. When inter_affine_flag[x0][y0] is not present, it is inferred to be equal to 0.

inter_pred_idc[x0][y0] specifies whether list0, list1, or bi-prediction is used for the current coding unit according to Table 2. The array indices x0, y0 specify the location (x0, y0) of the top-left luma sample of the considered coding block relative to the top-left luma sample of the picture.

When inter_pred_idc[x0][y0] is not present, it is inferred to be equal to PRED_L0.

TABLE 2

| | Name of inter_pred_idc | |
|---|---|---|
| inter_pred_idc | ( cbWidth + cbHeight ) != 8 | ( cbWidth + cbHeight ) = = 8 |
| 0 | PRED_L0 | PRED_L0 |
| 1 | PRED_L1 | PRED_L1 |
| 2 | PRED_BI | n.a. | sps_affine_enabled_flag specifies whether affine model based motion compensation can be used for inter prediction. If sps_affine_enabled_flag is equal to 0, the syntax shall be constrained such that no affine model based motion compensation is used in the CVS, and inter_affine_flag and cu_affine_type_flag are not present in coding unit syntax of the CVS. Otherwise (sps_affine_enabled_flag is equal to 1), affine model based motion compensation can be used in the CVS.

A syntax element inter_affine_flag[x0][y0] (or affine_inter_flag[x0][y0]) may be used to indicate whether the affine motion model-based AMVP mode is used for the current block when the slice in which the current block is located is a P-type slice or a B-type slice. When this syntax element does not appear in the bitstream, the syntax element is 0 by default. For example, inter_affine_flag[x0][y0]=1 indicates that the affine motion model-based AMVP mode is used for the current block; and inter_affine_flag[x0][y0]=0 indicates that the affine motion model-based AMVP mode is not used for the current block, and a translational motion model-based AMVP mode may be used. That is, inter_affine_flag[x0][y0] equal to 1 specifies that for the current coding unit, when decoding a P or B tile group, affine model based motion compensation is used to generate the prediction samples of the current coding unit. inter_affine_flag[x0][y0] equal to 0 specifies that the coding unit is not predicted by affine model based motion compensation. When inter_affine_flag[x0][y0] is not present, it is inferred to be equal to 0.

The syntax element cu_affine_type_flag[x0][y0] may be used to indicate whether the 6-parameter affine motion model is used to perform motion compensation for the current block when the slice in which the current block is located is a P-type slice or a B-type slice. cu_affine_type_flag[x0][y0]=0 indicates that the 6-parameter affine motion model is not used to perform motion compensation for the current block, and only the 4-parameter affine motion model may be used to perform motion compensation; and cu_affine_type_flag[x0][y0]=1 indicates that the 6-parameter affine motion model is used to perform motion compensation for the current block. That is, cu_affine_type_flag[x0][y0] equal to 1 specifies that for the current coding unit, when decoding a P or B tile group, 6-parameter affine model based motion compensation is used to generate the prediction samples of the current coding unit. cu_affine_type_flag[x0][y0] equal to 0 specifies that 4-parameter affine model based motion compensation is used to generate the prediction samples of the current coding unit.

As shown in Table 3, MotionModelIdc[x0][y0]=1 indicates that the 4-parameter affine motion model is used, MotionModelIdc[x0][y0]=2 indicates that the 6-parameter affine motion model is used, and MotionModelIdc[x0][y0]=0 indicates that the translational motion model is used.

TABLE 3

| | Motion model for motion compensation (motion model for motion compensation) |
|---|---|
| 0 | Translational motion (translational motion) |
| 1 | 4-parameter affine motion (4-parameter affine motion) |
| 2 | 6-parameter affine motion (6-parameter affine motion) |

Variables MaxNumMergeCand and MaxAffineNumMrgCand are used to represent a maximum list length, and indicate the maximum length of a constructed candidate motion vector list. inter_pred_idc[x0][y0] is used to indicate a prediction direction. PRED_L1 is used to indicate backward prediction. num_ref_idx_l0_active_minus1 indicates the number of reference frames in a forward reference frame list, and ref_idx_l0[x0][y0] indicates the forward reference frame index value of the current block. mvd_coding(x0, y0, 0, 0) indicates the first motion vector difference. mvp_l0_flag[x0][y0] indicates a forward MVP candidate list index value. PRED_L0 indicates forward prediction. num_ref_idx_l1_active_minus1 indicates the number of reference frames in a backward reference frame list. ref_idx_l1[x0][y0] indicates the backward reference frame index value of the current block, and mvp_l1_flag [x0][y0] indicates a backward MVP candidate list index value.

In Table 1, ae(v) represents a syntax element encoded by using context-based adaptive binary arithmetic coding (cabac).

Figure 9A:
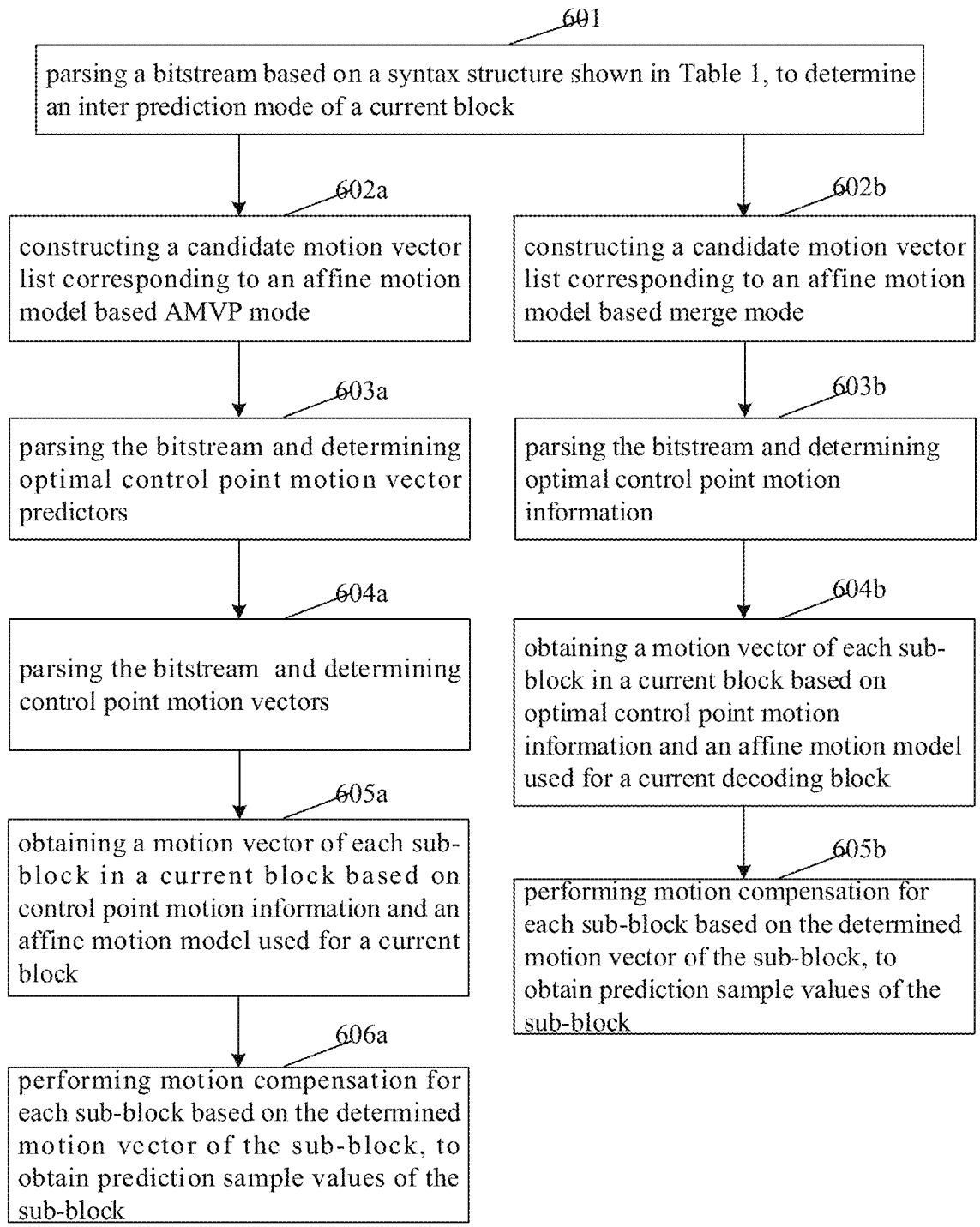
FIG. 9A is a flowchart showing a process of a decoding method according to an embodiment of this application.

FIG. 9A is a flowchart showing a process of a decoding method according to an embodiment of this application. The process may be performed by an inter prediction unit 344 of a video decoder 30. The process is described as a series of steps or operations. It should be understood that the process may be performed in various orders and/or concurrently, and is not limited to the execution order shown in FIG. 9A. It is assumed that a video decoder is employed to decode a video data stream having a plurality of video frames by using a process which includes the inter prediction process shown in FIG. 9A.

Step 601: Parse a bitstream based on a syntax structure shown in Table 1, to determine the inter prediction mode of the current block.

If it is determined that the inter prediction mode of the current block is an affine motion model-based AMVP mode, perform step 602a.

For example, syntax elements merge flag=0 and inter_affine_flag=1 indicate that the inter prediction mode of the current block is the affine motion model-based AMVP mode.

If it is determined that the inter prediction mode of the current block is an affine motion model-based merge mode, perform step 602b.

For example, syntax elements merge flag=1 and inter_affine_flag=1 indicate that the inter prediction mode of the current block is the affine motion model-based merge mode.

Step 602a: Construct a candidate motion vector list corresponding to the affine motion model-based AMVP mode.

One or more control point motion vectors candidates (e.g. one or more X-tuple candidates) of the current block can be derived by using an inherited control point motion vector prediction method and/or a constructed control point motion vector prediction method. These control point motion vectors candidates can be added to the candidate motion vector list.

The candidate motion vector list may include a 2-tuple list (a 4-parameter affine motion model is used for the current coding block) or a 3-tuple list. The 2-tuple list includes one or more 2-tuples used for constructing a 4-parameter affine motion model. The 3-tuple list includes one or more 3-tuples used for constructing a 6-parameter affine motion model. It can be understood that each 2-tuple candidate includes two candidate control point motion vectors of the current block.

Optionally, the candidate motion vector 2-tuple/3-tuple list is pruned and sorted according to a particular rule, and may be truncated or padded to include a particular quantity of 2-tuples or 3-tuples.

A1: A process of constructing the candidate motion vector list by using the inherited control point motion vector prediction method is described.

FIG. 7 is used as an example. In this example, blocks at neighboring locations around the current block are traversed in an order of A1→B1→B0→A0→B2 to find an affine coded block containing a block at a neighboring location of the current block, and to obtain control point motion information of the affine coded block. The control point motion information of the affine coded block can be utilized to construct a motion model to derive candidate control point motion information of the current block. Details of this process are provided above in the descriptions of the inherited control point motion vector prediction method in 3.

In one example, the affine motion model used for the current block is a 4-parameter affine motion model (that is, MotionModelIdc=1). In this example, if the 4-parameter affine motion model is used for a neighboring affine decoding block, motion vectors of two control points of the affine decoding block are obtained: the motion vector (vx4, vy4) of the top-left control point (x4, y4), and the motion vector (vx5, vy5) of the top-right control point (x5, y5). The affine decoding block is an affine coded block predicted in an encoding phase by using an affine motion model.

The motion vectors of the two control points, namely, the top-left and top-right control points, of the current block are derived according to 4-parameter affine motion model formulas (6) and (7), respectively, by using a 4-parameter affine motion model including two control points of the neighboring affine decoding block.

If a 6-parameter affine motion model is used for the neighboring affine decoding block, motion vectors of three control points of the neighboring affine decoding block are obtained, for example, the motion vector (vx4, vy4) of the top-left control point (x4, y4), the motion vector (vx5, vy5) of the top-right control point (x5, y5), and the motion vector (vx6, vy6) of the bottom-left control point (x6, y6) in FIG. 7.

The motion vectors of the two control points, namely, the top-left and top-right control points, of the current block are derived according to 6-parameter affine motion model formulas (8) and (9), respectively, by using the 6-parameter affine motion model including three control points of the neighboring affine decoding block.

In another example, the affine motion model used for the current decoding block is a 6-parameter affine motion model (that is, MotionModelIdc=2).

If the affine motion model used for the neighboring affine decoding block is the 6-parameter affine motion model, motion vectors of three control points of the neighboring affine decoding block are obtained, for example, the motion vector (vx4, vy4) of the top-left control point (x4, y4), the motion vector (vx5, vy5) of the top-right control point (x5, y6), and the motion vector (vx6, vy6) of the bottom-left control point (x6, y6) in FIG. 7.

The motion vectors of the three control points, namely, the top-left, top-right, and bottom-left control points, of the current block are derived according to formulas (8), (9), and (10) corresponding to the 6-parameter affine motion model, respectively, by using the 6-parameter affine motion model including three control points of the neighboring affine decoding block.

If the affine motion model used for the neighboring affine decoding block is a 4-parameter affine motion model, motion vectors of two control points of the neighboring affine decoding block can be obtained. These motion vectors can be, for example, the motion vector (vx4, vy4) of the top-left control point (x4, y4) and the motion vector (vx5, vy5) of the top-right control point (x5, y5).

The motion vectors of three control points, such as, the top-left, top-right, and bottom-left control points, of the current block can be derived. For example, these motion vectors can be derived according to 4-parameter affine motion model formulas (6) and (7) by using the 4-parameter affine motion model represented based on two control points of the neighboring affine decoding block.

It should be noted that other motion models, candidate locations, and search orders can also be employed herein. Further, methods for representing the motion models of neighboring and current coding blocks based on other control points can also be used.

A2: A process of constructing a candidate motion vector list by using the constructed control point motion vector prediction method is described.

In one example, the affine motion model used for a current decoding block is a 4-parameter affine motion model (that is, MotionModelIdc=1). In this example, motion vectors of the top-left sample and the top-right sample of the current coding block are determined based on motion information of a neighboring encoded block of the current coding block. Specifically, the candidate motion vector list may be constructed by using the constructed control point motion vector prediction method 1 described above with respect to item 4 or the constructed control point motion vector prediction method 2 described above with respect to item 5.

In another example, the affine motion model used for the current decoding block is a 6-parameter affine motion model (that is, MotionModelIdc=2). In this example, motion vectors of the top-left sample, the top-right sample, and the bottom-left sample of the current coding block are determined by using motion information of a neighboring encoded block of the current coding block. Specifically, the candidate motion vector list may be constructed by using the constructed control point motion vector prediction method 1 described above with respect to item 4 or the constructed control point motion vector prediction method 2 described above with respect to item 5.

It should be noted that other combinations of control point motion information can also be employed.

Step 603a: Parse the bitstream and determine optimal control point motion vector predictors (i.e. an optimal multiple-tuple candidate).

B1: If an affine motion model used for the current decoding block is a 4-parameter affine motion model (MotionModelIdc=1), an index number is parsed from the bitstream, and optimal motion vector predictors of two control points are determined from the candidate motion vector list based on the index number.

For example, the index number is mvp_l0_flag or mvp_l1_flag.

B2: If an affine motion model used for the current decoding block is a 6-parameter affine motion model (MotionModelIdc=2), an index number is parsed from the bitstream, and optimal motion vector predictors of three control points are determined from the candidate motion vector list based on the index number.

Step 604a: Parse the bitstream and determine control point motion vectors.

C1: If an affine motion model used for the current decoding block is a 4-parameter affine motion model (MotionModelIdc=1), motion vector differences of two control points of the current block are respectively obtained by decoding the bitstream. The motion vector values of the two control points are then obtained based on the motion vector differences and the corresponding motion vector predictors of the control points. Using forward prediction as an example, motion vector differences of two control points are mvd_coding(x0, y0, 0, 0) and mvd_coding(x0, y0, 0, 1), respectively.

For example, motion vector differences of the top-left control point and the top-right control point are obtained by decoding the bitstream, and are added to their respective motion vector predictors, to obtain motion vectors of the top-left control point and the top-right control point of the current block.

C2: An affine motion model used for a current decoding block is a 6-parameter affine motion model (MotionModelIdc=2).

Motion vector differences of three control points of the current block are obtained by decoding the bitstream. Motion vector values of these control points are obtained based on motion vector differences and respective motion vector predictors of the control points. Using forward prediction (i.e. list 0) as an example, motion vector differences of three control points are mvd_coding(x0, y0, 0, 0), mvd_coding(x0, y0, 0, 1), and mvd_coding(x0, y0, 0, 2), respectively.

For example, motion vector differences of the top-left control point, the top-right control point, and the bottom-left control point are obtained by decoding the bitstream. These motion vector differences are added to their respective motion vector predictors to obtain motion vectors of the top-left control point, the top-right control point, and the bottom-left control point of the current block.

Step 605a: Obtain a motion vector of each sub-block in the current block based on control point motion information and an affine motion model used for the current decoding block.

Figure 9B:
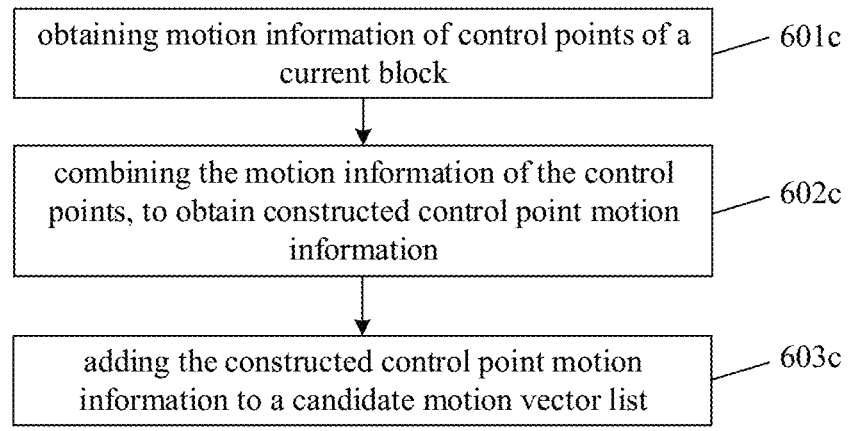
FIG. 9B is a diagram showing a constructed control point motion vectors prediction method.
Figure 9C:
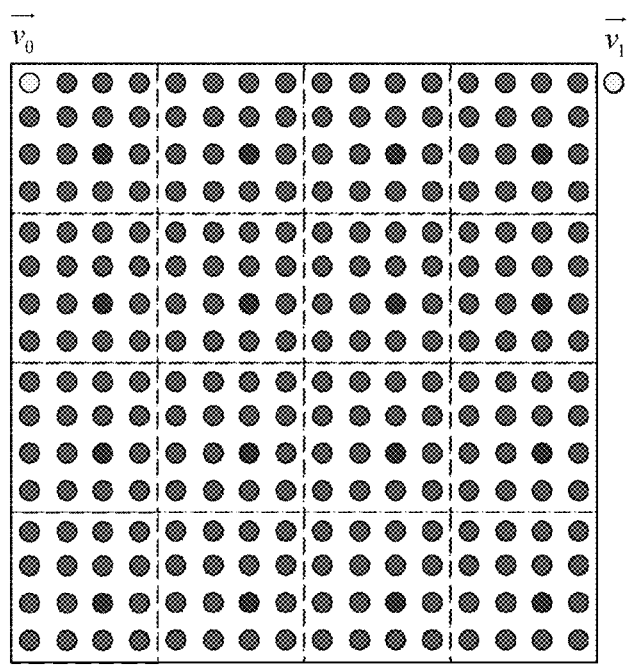
FIG. 9C is a diagram showing samples or pixels of a current affine coded block and showing motion vectors of the top-left control point and the top-right control point.

A sub-block in the current affine decoding block may be equivalent to one motion compensation unit, and the width and the height of the sub-block are less than the width and the height of the current block. Motion information of a sample at a preset location in a sub-block or motion compensation unit may be used to represent motion information of all samples in sub-block or the motion compensation unit. Assuming that the size of the motion compensation unit is M×N, the sample at the preset location may be a center sample (M/2, N/2), a top-left sample (0, 0), a top-right sample (M−1, 0), or a sample at another location in the motion compensation unit. The following description uses the center sample of the motion compensation unit as an example for description. Referring to FIG. 9C, V0 represents a motion vector of the top-left control point, and V1 represents a motion vector of the top-right control point. Each small box represents one motion compensation unit.

Coordinates of a center sample of a motion compensation unit relative to the top-left sample in a current affine decoding block are calculated according to formula (25). In formula (25), i indicates the $i^{th}$ motion compensation unit in the horizontal direction (left to right), j indicates the $j^{th}$ motion compensation unit in the vertical direction (top to bottom), and $(x_{(i,j)}, y_{(i,j)})$ represents the coordinates of the center sample of the $(i,j)^{th}$ motion compensation unit relative to the top-left control point sample in the current affine decoding block.

If the affine motion model used for the current affine decoding block is a 6-parameter affine motion model, $(x_{(i,j)}, y_{(i,j)})$ is substituted into the 6-parameter affine motion model formula (26) to obtain the motion vector of the center sample of each motion compensation unit $(vx_{(i,j)}, vy_{(i,j)})$. As discussed above, the motion vector of the center pixel of a motion compensation unit is used as the motion vectors of all samples in the motion compensation unit.

If the affine motion model used for the current affine decoding block is a 4-affine motion model, $(x_{(i,j)}, y_{(i,j)})$ is substituted into the 4-parameter affine motion model formula (27), to obtain the motion vector of a center sample of each motion compensation unit$(vx_{(i,j)}, vy_{(i,j)})$ which is used as the motion vectors of all samples in the motion compensation unit.

$$\begin{cases} x_{(i,j)} = M \times i + \frac{M}{2}, & i = 0, 1 \\ y_{(i,j)} = N \times j + \frac{N}{2}, & j = 0, 1 \end{cases} \quad (25)$$

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (26)$$

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases} \quad (27)$$

Step 606a: Perform motion compensation for each sub-block based on the determined motion vector of the sub-block, to obtain prediction sample values of the sub-block.

As discussed above, if it is determined at step 601 that the inter prediction mode of the current block is an affine motion model-based merge (merge) mode, step 602b is performed.

Step 602b: Construct a motion information candidate list corresponding to the affine motion model-based merge mode.

Specifically, the motion information candidate list corresponding to the affine motion model-based merge mode may be constructed by using an inherited control point motion vector prediction method and/or a constructed control point motion vector prediction method.

Optionally, the motion information candidate list is pruned and sorted according to a particular rule, and may be truncated or padded to contain a particular quantity of motion information.

D1: A process of constructing the candidate motion vector list by using the inherited control point motion vector prediction method is described.

Candidate control point motion information of the current block is derived by using the inherited control point motion vector prediction method, and is added to the motion information candidate list.

In the example shown in FIG. 8A, blocks at neighboring locations around the current block are traversed according to the order of A1→B1→B0→A0→B2 to find an affine coded block in which a neighboring block is located, and obtain control point motion information of the affine coded block.

Further, candidate control point motion information of the current block is derived by using the motion model of the current block.

If the candidate motion vector list is empty, the candidate control point motion information obtained above is added to the candidate list. Otherwise, motion information in the candidate motion vector list is traversed sequentially, to check whether motion information that is the same as the candidate control point motion information exists in the candidate motion vector list. If no motion information that is the same as the candidate control point motion information exists in the candidate motion vector list, the candidate control point motion information is added to the candidate motion vector list.

Determining whether two pieces of candidate motion information are the same can be performed by determining whether forward (list 0) and backward (list 1) reference frames of the candidate motion information and horizontal and vertical components of each forward and backward motion vector are the same. The two pieces of candidate motion information are considered as being different only when all these elements are different.

If a quantity of pieces of motion information in the candidate motion vector list reaches a maximum list length MaxAffineNumMrgCand (MaxAffineNumMrgCand is a positive integer such as 1, 2, 3, 4, or 5, and 5 is used as an example in the following description), construction of the candidate list is completed. Otherwise, a next neighboring block is traversed.

D2: The candidate control point motion information of the current block is derived by using the constructed control point motion vector prediction method, and is added to the motion information candidate list. FIG. 9B shows an example of a flowchart for the constructed control point motion vectors prediction method.

Step 601c: Obtain motion information of control points of the current block. This step is similar to step 501 in "5. Constructed control point motion vector prediction method 2". Details are not repeated herein.

Step 602c: Combine the motion information of the control points, to obtain constructed control point motion information. This step is similar to step 501 in FIG. 8B and the details of this step are not described herein again.

Step 603c: Add the constructed control point motion information to the candidate motion vector list.

If the length of the candidate list is less than a maximum list length MaxAffineNumMrgCand, the combinations of motion information of control points are traversed in a preset order, and a resulting valid combination is used as the candidate control point motion information. In this case, if the candidate motion vector list is empty, the candidate control point motion information is added to the candidate motion vector list. Otherwise, motion information in the candidate motion vector list is traversed sequentially, to check whether motion information that is the same as the candidate control point motion information exists in the candidate motion vector list. If no motion information that is the same as the candidate control point motion information exists in the candidate motion vector list, the candidate control point motion information is added to the candidate motion vector list.

For example, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4). There are 10 combinations in total.

If control point motion information corresponding to a combination is unavailable, this combination is deemed unavailable. If a combination is available, a reference frame index of the combination is determined. In a case of two control points, the minimum reference frame index is selected as the reference frame index of the combination. In a case of more than two control points, a reference frame index with a maximum presence frequency is selected as the reference frame index of the combination. If a plurality of reference frame indexes have the same presence frequency, the minimum reference frame index is selected as the reference frame index. The control point motion vector is further scaled. If motion information of all control points after scaling is consistent, the combination is invalid.

Optionally, in this embodiment of this application, the candidate motion vector list may be padded. For example, after the foregoing traversal process, if the length of the candidate motion vector list is less than the maximum list length MaxAffineNumMrgCand, the candidate motion vector list may be padded until the list length is equal to MaxAffineNumMrgCand.

The padding may be performed by using a zero motion vector padding method, or by combining (e.g., weighted averaging) existing candidate motion information in the existing list. It should be noted that other methods for padding the candidate motion vector list are also applicable to this application.

Step 603b: Parse the bitstream and determine optimal control point motion information.

An index number is parsed, and the optimal control point motion information is determined from the candidate motion vector list based on the index number.

Step 604b: Obtain a motion vector of each sub-block in the current block based on optimal control point motion information and an affine motion model used for the current decoding block.

This step is similar to step 605a.

Step 605b: Perform motion compensation for each sub-block based on the determined motion vector of the sub-block, to obtain prediction sample values of the sub-block.

As described above, after the motion vector of each sub-block is obtained in step 605a and 604b, motion compensation for the sub-block is performed in step 606a and 605b, respectively. That is, the details of performing sub-block-based affine motion compensation for a current sub-block of the affine coded block, to obtain prediction sample values of the current sub-block of the affine coded block is described above. In the conventional design, the size of the sub-block is set to 4×4, that is, motion compensation is performed for each 4×4 unit by using a respective/different motion vector. Generally, a smaller size of a sub-block leads to higher motion compensation calculation complexity and a better prediction effect. To take both the motion compensation calculation complexity and the prediction accuracy into consideration, after the subblock-level motion compensation, a process for prediction signal refinement with optical flow (PROF) is provided. example steps of the process are as follows:

(1) After a motion vector of each sub-block is obtained by using steps 605a and 604b, and then perform motion compensation for the sub-block by using steps 606a and 605b, to obtain a prediction signal I(i,j) of the sub-block. It can be noted that step (1) is not included in the PROF process.

(2) Calculate a horizontal gradient value $g_x(i,j)$ and a vertical gradient value $g_y(i,j)$ of the prediction signal of the sub-block, where a calculation method is as follows:

$$g_x(i,j)=I(i+1,j)-I(i-1,j)$$

$$g_y(i,j)=I(i,j+1)-I(i,j-1)$$

Figure 9D:
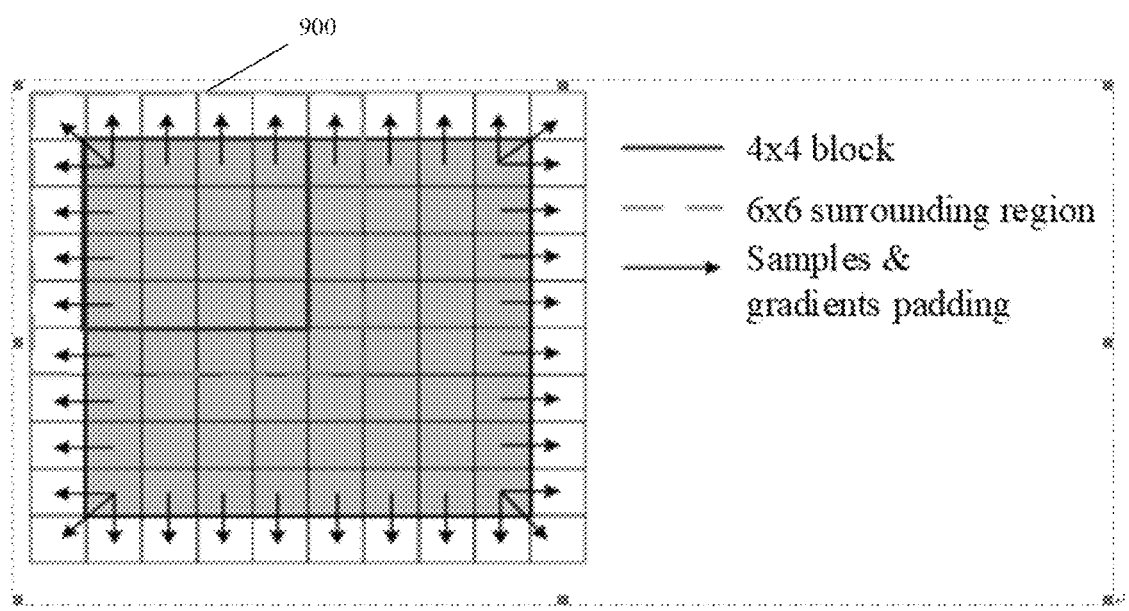
FIG. 9D is a diagram illustrating a 6×6 prediction signal window for calculating or generating a horizontal prediction gradient matrix and a vertical prediction gradient matrix and a 4×4 subblock.

It can be learned from the formulas that, to obtain the gradient values for a 4×4 block (4×4 gradient values), a 6×6 prediction signal window 900 is required, as shown in FIG. 9D.

This can be implemented by using the following different methods:

a) After a prediction matrix of a sub-block is obtained based on motion information (for example, a motion vector) of the sub-block, obtain a horizontal gradient matrix and a vertical gradient matrix of the sub-block. In other words, the (M+2)*(N+2) prediction block is obtained through interpolation based on the motion vector of the M×N sub-block. For example, interpolation is directly performed based on the motion vector of the sub-block, to obtain a 6×6 prediction signal, and calculate a 4×4 gradient value (i.e. 4×4 gradient matrix).

b) Perform interpolation based on the motion vector of the sub-block, to obtain a 4×4 prediction signal (i.e. the first prediction matrix), and then perform edge extension on the prediction signal, to obtain a 6×6 prediction signal (i.e. the second prediction matrix) and calculate a 4×4 gradient value (i.e. 4×4 gradient matrix).

c) Perform interpolation based on the motion vector of each sub-block, to obtain each 4×4 prediction signal (i.e. the first prediction matrix), and obtain a w*h prediction signal through combination. Then, perform edge extension on the w*h prediction signal, to obtain a (w+2)*(h+2) prediction signal, and calculate a w*h gradient value (i.e. w*h gradient matrix), to obtain each 4×4 gradient value (i.e. 4×4 gradient matrix).

Figure 13:
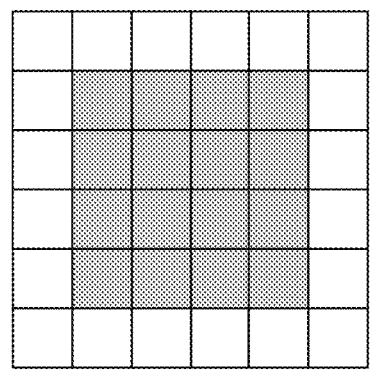
FIG. 13 is a diagram showing a surrounding region and an inner region of a (M+2)*(N+2) prediction block according to an embodiment of the present disclosure.

It should be noted that, obtaining an (M+2)*(N+2) prediction block directly through interpolation based on the motion vector of the M×N sub-block includes the following implementations:

a1) for a surrounding region (white samples in FIG. 13), an integer sample of a top-left sample of a location to which the motion vector points is obtained. For an inner region (gray samples in FIG. 13), a sample of a location to which the motion vector points is obtained. If the sample is a fractional sample, the sample is obtained through interpolation by using an interpolation filter.

Figure 14:
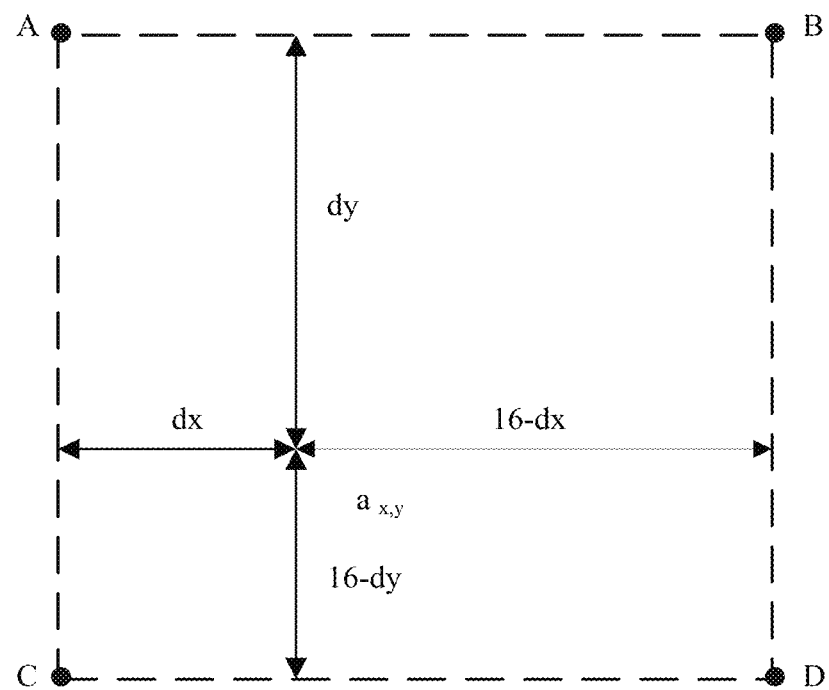
FIG. 14 is a diagram showing a surrounding area and an internal area of a (M+2)*(N+2) prediction block according to another embodiment of the present disclosure.

As shown in FIGS. 14, A, B, C, and D are integer samples, a motion vector of an M×N sub-block is of 1/16 sample precision, dx/16 is a horizontal distance between a fractional sample and the integer sample of a top-left sample, and dy/16 is a vertical distance between the fractional sample and the integer sample of the top-left sample. For the surrounding region, a sample value of A is used as the prediction sample value of the sample location. For an inner region, the prediction sample value of the sample location is obtained through interpolation by using an interpolation filter.

a2) for a surrounding region (white samples in FIG. 13), an integer sample nearest to a location to which the motion vector points is obtained. For an inner region (gray samples in FIG. 13), a sample of a location to which the motion vector points is obtained. If the sample is a fractional sample, the sample is obtained through interpolation by using an interpolation filter.

As shown in FIG. 14, for a surrounding region, an integer sample nearest to a location to which the motion vector points is selected based on dx and dy.

a3) For both a surrounding region and an inner region, the sample of a location to which the motion vector points is obtained. If the sample is a fractional sample, the sample is obtained through interpolation by using an interpolation filter.

It should be understood that a), b), and c) are three different implementations.

(3) Calculate a delta prediction value, where a calculation method is as follows:

$$\Delta I(i,j)=g_x(i,j)*\Delta v_x(i,j)+g_y(i,j)*\Delta v_y(i,j)$$

Figure 10:
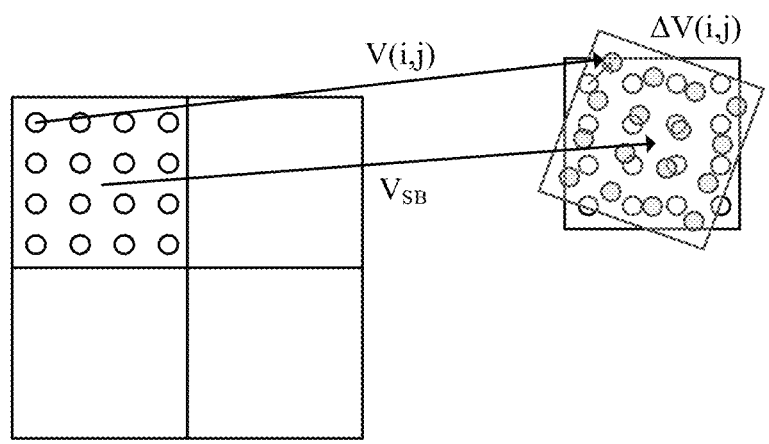
FIG. 10 is a diagram showing the difference Δv(i,j) (red arrow) between sample MV computed for sample location (i,j), denoted by v(i,j), and the subblock MV ($V_{SB}$) of the subblock to which sample (i,j) belongs.

(i,j) represents a current sample of the sub-block, $\Delta v(i,j)$ is a difference (as shown in FIG. 10) between a motion vector of the current sample of the current sub-block and a motion vector of a center sample of the sub-block, and may be calculated according to the foregoing formula, and $\Delta v_x(i,j)$ and $\Delta v_y(i,j)$ are a horizontal offset value and a vertical offset value of a difference between a motion vector of the current sample of the current sub-block and a motion vector of a center sample of the sub-block. Alternatively, in a simplified method, a motion vector difference between a motion vector of each 2×2 sample block to which the current sample belong and a motion vector of a center sample of the sub-block may be calculated. In comparison, $\Delta v(i,j)$: a motion vector difference needs to be calculated for each pixel or sample (for example, calculation needs to be performed 16 times for a 4×4 sub-block). However, in the simplified method, a motion vector difference is calculated for each 2×2 sub-block (for example, calculation is performed four times for the 4×4 sub-block). It should be noted that the sub-block herein may be a 4×4 sub-block or an m×n sub-block. For example, m herein is greater than or equal to 4, or n herein is greater than or equal to 4.

$$\begin{cases} \Delta v_x(x,y) = c*x + d*y \\ \Delta v_y(x,y) = e*x + f*y \end{cases}$$

For a 4-Parameter Affine Model:

$$\begin{cases} c = f = \dfrac{v_{1x} - v_{0x}}{w} \\ e = -d = \dfrac{v_{1y} - v_{0y}}{w} \end{cases}$$

For a 6-Parameter Affine Model:

$$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$ and $(v_{2x}, v_{2y})$ are motion vectors of top-left, top-right, and bottom-left control points, and w and h are a width and a height of an affine coded block (CU).

(4) Perform Prediction Refinement:

$$I'(i,j) = I(i,j) + \Delta I(i,j)$$

where I(i,j) is a prediction value of a sample (i,j) of the sub-block (i.e. prediction sample value at location (i,j) in the subblock), $\Delta I(i,j)$ is a delta prediction value of the sample (i, j) of the sub-block, and I'(i,j) is a refined prediction sample value of the sample (i,j) of the sub-block.

The prediction refinement with optical flow (PROF) process is conditionally performed to refine the sub-block based affine motion compensated prediction with optical flow according to embodiment of the present disclosure is described as follows.

Embodiment 1

A method for obtaining delta prediction values of a sub-block (which is specifically a delta prediction value of each sample of the sub-block) with optical flow may be applied to a unidirectional affine coded block, or may be applied to a bidirectional affine coded block. If the method is applied to a bidirectional affine prediction block, steps (1) to (4) described above need to be performed twice, resulting in relatively high computational complexity. To reduce complexity of the method, the present disclosure provides a constraint for applying PROF. To be specific, prediction sample values are refined by using this method only when the affine coded block is a unidirectional affine coded block.

At the decoder side, a syntax element obtained by parsing a bitstream indicates uni- or bi-prediction. This syntax element can be used to determine whether the affine coded block is a unidirectional affine coded block.

At the encoder side, structures of B and P frames are determined by different user cases, and whether uni- or bi-prediction is used in the B frame is determined by RDO. In other words, for the B frame, the encoder side may determine, based on an RDO cost, whether uni- or bi-prediction is used for the current affine picture block. For example, the encoder side attempts to select a mechanism among the forward prediction, backward prediction and bidirectional prediction that minimize the RDO.

Embodiment 2

To reduce the complexity of the prediction signal refinement with optical flow, the method for obtaining a prediction offset value of a sub-block with optical flow may be used only when the size of the sub-block is relatively large. For example, the sub-block size of a unidirectional affine coded block may be set to 4×4, and the sub-block size of a bidirectional affine coded block may be set to 8×8, 8×4, or 4×8. In this example, the method is used only when the sub-block size is greater than 4×4. For another example, the sub-block size may be adaptively selected based on information such as motion vectors of control points of the affine coded block, the width and height of the affine coded block, and the like. The method is used only when the sub-block size is greater than 4×4.

In addition, in step (2), the methods a) and b) can both ensure that prediction of each 4×4 sub-block of the affine coded block has no dependency and can be performed concurrently. However, the method a) increases complexity of interpolation calculation. Although the method b) does not increase complexity, the gradient value of the boundary is obtained through calculation by using an extended sample, and the accuracy is not high. The method c) can improve accuracy of gradient calculation, but each 4×4 sub-block has dependency, that is, refinement based on optical flow can be performed only when interpolation of an entire CU is completed.

Figure 9E:
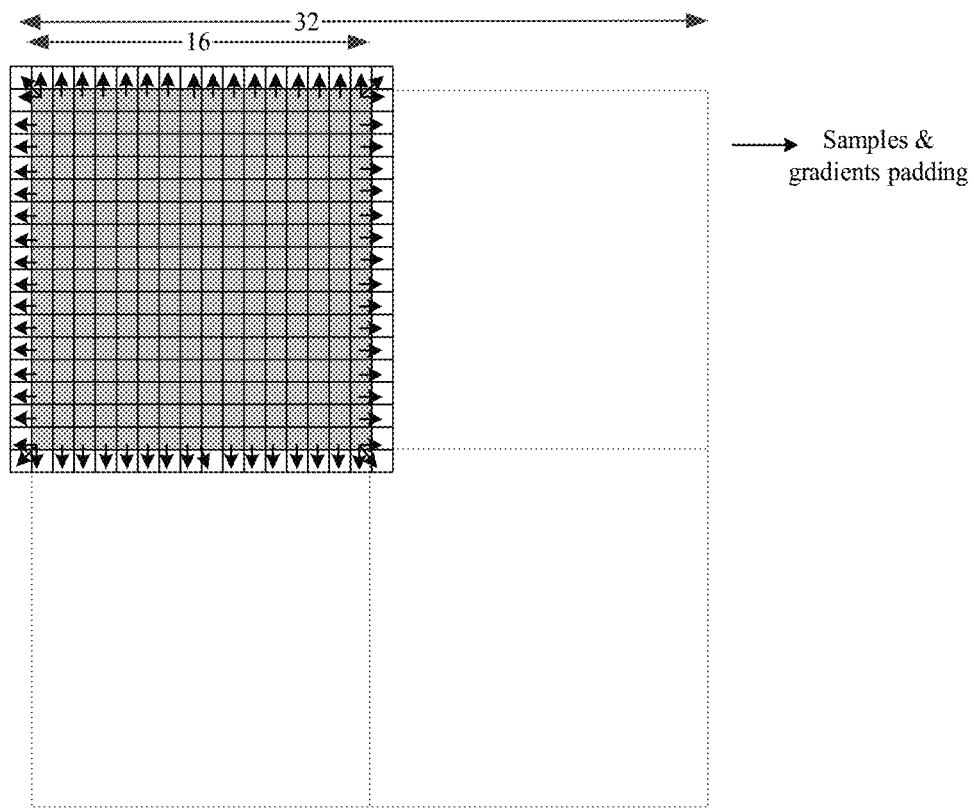
FIG. 9E is a diagram illustrating a 18×18 prediction signal window for calculating or generating a horizontal prediction gradient matrix and a vertical prediction gradient matrix and a 16×16 block.

As shown in FIG. 9E, to take both concurrency and accuracy of gradient calculation into consideration, the present disclosure proposes gradient value calculation based on a granularity of 16×16. Given size_w=min(w, 16), and size_h=min(h, 16), for each size w*size_h in the affine coded block, the predictor(prediction sample values) of each 4×4 sub-block in the affine coded block is calculated, and the size_w*size_h prediction signal is obtained through combination. Then, edge extension is performed on the size_w*size_h prediction signal (for example, extended two samples outward, such as by padding), to obtain a (size w+2)*(size_h+2) prediction signal. The size_w*size_h gradient value is calculated, to obtain each 4×4 gradient value. It should be understood that a quantity of samples extended outward in this application is not limited to two samples, and is related to gradient calculation. If the gradient resolution is 3-tap, two samples are extended outward. In other words, this is related to a filter for gradient calculation. Assuming that a quantity of taps of the filter is T, an added region or a surrounding region supported is T/2 (divisible)*2.

Figure 11A:
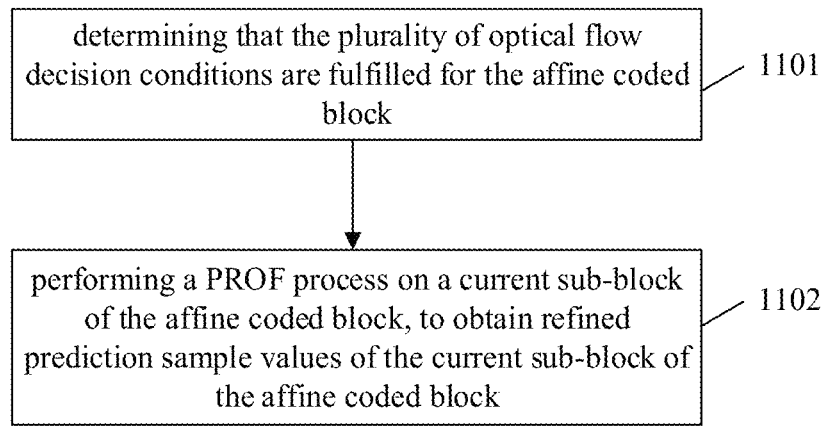
FIG. 11A is a diagram showing a method for prediction refinement with optical flow (PROF) for an affine coded block according to an embodiment of the present disclosure.
Figure 11B:
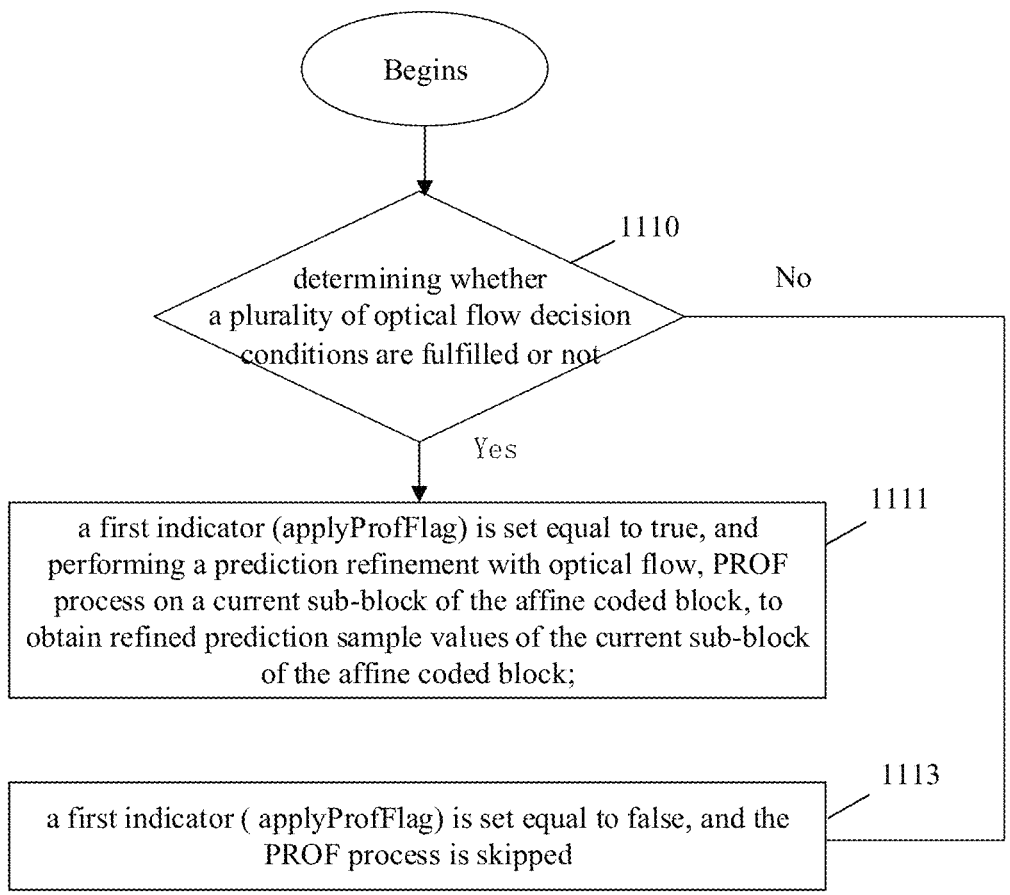
FIG. 11B is a diagram showing another method for prediction refinement with optical flow (PROF) for an affine coded block according to another embodiment of the present disclosure.

FIG. 11A shows a method for prediction refinement with optical flow (PROF) for an affine coded block according to one embodiment, the method can be performed by a coding apparatus (such as a decoding apparatus or a decoder). The method includes the following steps:

S1101. determine that a plurality of optical flow decision conditions are fulfilled;

Here the optical flow decision conditions can also be called as conditions allowing for the application of PROF. If all of the optical flow decision conditions are satisfied, the PROF is applied for the current sub-block of the affine coded block. Examples of the optical flow decision conditions are described below. In some examples, the optical flow decision conditions may be replaced with or rephrased as constraint conditions for applying PROF. If a constraint condition for applying PROF is satisfied, then the PROF is not applied to the current sub-block of the affine coded block. In those examples, the step S1101 will be changed to determining that none of a plurality of the constraint conditions for applying PROF are fulfilled.

S1102. performing a PROF process for a current sub-block of the affine coded block, to obtain refined prediction sample values of the current sub-block of the affine coded block, where the plurality of optical flow decision conditions are all fulfilled for the affine coded block. Here the refined prediction sample values of the current sub-block can be understood as final prediction sample values of the current sub-block after the prediction refinement is added.

In step S1102, perform optical flow (prediction refinement with optical flow, PROF) processing for one or more sub-blocks (for example, a current sub-block or each sub-block) in the current affine picture block, to obtain a delta prediction value (for example, ΔI(i,j)) of the one or more sub-blocks (for example, the current sub-block or each sub-block) in the current affine picture block.

Step S1102 involves obtaining a refined prediction sample value (for example, a prediction signal I'(i,j)) of the sub-block based on the delta prediction value (for example, ΔI(i,j)) of the sub-block and a prediction sample value (for example, a prediction signal I(i,j)) of the sub-block.

Specifically, step S1102 involves obtaining a refined predictor (for example, a prediction signal I'(i,j)) of a current sample in the sub-block based on a delta prediction value (for example, ΔI(i,j)) of the current sample in the sub-block and a predictor (for example, a prediction signal I(i,j)) of the current sample in the sub-block.

In a possible design, the plurality of optical flow decision conditions include one or more of the following:

(a) Indication information (for example, sps_prof_enabled_flag or sps_bdof_enabled_flag) obtained through parsing or derivation indicates that PROF is enabled for a current sequence, picture, slice, or tile group. For example, sps_prof_enabled_flag or sps_bdof_enabled_flag=1. It can be understood that if constraint conditions for applying PROF are used in S1101 instead of the optical flow decision conditions, this condition can be converted to a constraint condition for applying PROF as: (a) Indication information indicates that PROF is disabled for a current sequence, picture, slice, or tile group. For example, sps_prof_disabled_flag or sps_bdof_disabled_flag=1.

Indication information obtained by parsing a parameter set such as SPS, PPS, a slice header, or a tile group header indicates whether PROF is enabled for the current sequence, picture, slice, or tile group.

Specifically, sps_prof_enabled_flag may be used for control, and syntax and semantics of sps_prof_enabled_flag are as follows:

| seq_parameter_set_rbsp( ) { | Descriptor |
|---|---|
| ... | |
| sps_affine_enabled_flag | u(1) |
| if( sps_affine_enabled_flag ) { | |
| sps_affine_type_flag | u(1) |
| sps_prof_enabled_flag | u(1) |
| } | |
| ... | | sps_prof_enabled_flag equal to 0 specifies that the prediction refinement optical flow for affine based motion compensation is disabled. sps_prof_enabled_flag equal to 1 specifies that the prediction refinement optical flow for affine based motion compensation is enabled.

Alternatively, sps_bdof_enabled_flag is reused for control.

It should be understood that, in this embodiment, another condition is further derived on the premise that the foregoing condition is met (for example, a main switch determines to enable PROF). In other words, if PROF is enabled for the current sequence, picture, slice, or tile group, it is further determined whether the current affine picture block meets another optical flow decision condition described below. If PROF is not enabled for the current sequence, picture, slice, or tile group, it is unnecessary to determine whether the current affine picture block meets another optical flow decision condition provided in the following.

(b) Derived indication information (for example, the variable fallbackModeTriggered) indicates that the current affine coded block is to be partitioned. For example, fallbackModeTriggered=0. It can be understood that if constraint conditions for applying PROF are used in S1101, instead of the optical flow decision conditions, condition (b) can be converted to a constraint condition for applying PROF as: (b) derived indication information indicates that the current affine coded block is no partitioned. For example, fallbackModeTriggered=1.

A variable fallbackModeTriggered is derived based on an affine parameter, and whether to use PROF depends on fallbackModeTriggered. When fallbackModeTriggered is 1, it indicates that the current affine coded block is not to be partitioned. When fallbackModeTriggered is 0, it indicates that the affine coded block is to be partitioned (for example, the affine coded block is partitioned into sub-blocks, for example, 4×4 sub-blocks). PROF is to be used when the current affine coded block is to be partitioned.

Specifically, the variable fallbackModeTriggered may be derived by using the following process:

The variable fallbackModeTriggered is initially set to 1, and is further derived as follows:

The variables bxWX$_4$, bxHX$_4$, bxWX$_h$, bxHX$_h$, bxWX$_v$, and bxHX$_v$ are derived as follows:

$$\max W_4 = \text{Max}(0, \text{Max}(4*(2048+d\text{Hor}X), \text{Max}(4*d\text{Hor}Y, 4*(2048+d\text{Hor}X)+4*d\text{Hor}Y))) \quad (8\text{-}775)$$

$$\min W_4 = \text{Min}(0, \text{Min}(4*(2048+d\text{Hor}X), \text{Min}(4*d\text{Hor}Y, 4*(2048+d\text{Hor}X)+4*d\text{Hor}Y))) \quad (8\text{-}775)$$

$$\max H_4 = \text{Max}(0, \text{Max}(4*d\text{Ver}X, \text{Max}(4*(2048+d\text{Ver}Y), 4*d\text{Ver}X+4*(2048+d\text{Ver}Y)))) \quad (8\text{-}775)$$

$$\min H_4 = \text{Min}(0, \text{Min}(4*d\text{Ver}X, \text{Min}(4*(2048+d\text{Ver}Y), 4*d\text{Ver}X+4*(2048+d\text{Ver}Y)))) \quad (8\text{-}775)$$

$$bxWX_4 = ((\max W_4 - \min W_4) >> 11) + 9 \quad (8\text{-}775)$$

$$bxHX_4 = ((\max H_4 - \min H_4) >> 11) + 9 \quad (8\text{-}775)$$

$$bxWX_h = ((\text{Max}(0, 4*(2048+d\text{Hor}X)) - \text{Min}(0, 4*(2048+d\text{Hor}X))) >> 11) + 9 \quad (8\text{-}775)$$

$$bxHX_h = ((\text{Max}(0, 4*d\text{Ver}X) - \text{Min}(0, 4*d\text{Ver}X)) >> 11) + 9 (8\text{-}775)$$

$$bxWX_v = ((\text{Max}(0, 4*d\text{Ver}Y) - \text{Min}(0, 4*d\text{Ver}Y)) >> 11) + 9 (8\text{-}775)$$

$$bxHX_v = ((\text{Max}(0, 4*(2048+d\text{Hor}Y)) - \text{Min}(0, 4*(2048+d\text{Hor}Y))) >> 11) + 9 \quad (8\text{-}775)$$

If inter_pred_idc[xCb][yCb] is equal to PRED_BI and bxWX$_4$*bxHX$_4$ is less than or equal to 225, fallbackModeTriggered is set equal to 0.

Otherwise, if both bxWX$_h$*bxHX$_h$ is less than or equal to 165 and bxWX$_v$*bxHX$_v$ is less than or equal to 165, fallbackModeTriggered is set equal to 0.

(c) The current affine picture block is a uni-prediction affine picture block.

(d) The size of the sub-block in the affine picture block is greater than N×N, where N=4. [0374] (e) The current affine picture block is a uni-prediction affine picture block and the size of the sub-block in the affine picture block is equal to N×N, where N=4.

(f) The current affine picture block is a bi-prediction affine picture block and the size of the sub-block in the affine picture block is greater than N×N, where N=4.

The current affine picture block is the current affine encoding block, and that the current affine picture block is a uni-prediction affine picture block is determined by using the following method:

At encoder side, it is determined, based on a rate-distortion criterion RDO, that uni-prediction is used for the current affine picture block.

The current affine picture block is the current affine decoding block, and that the current affine picture block is a uni-prediction affine picture block is determined by using the following method:

at decoder side, in an AMVP mode, prediction direction indication information is used to indicate a uni-prediction direction (for example, only forward prediction or only backward prediction), and the prediction direction indication information is obtained by parsing a bitstream or through derivation; or at decoder side, in a merge mode, candidate motion information corresponding to a candidate index in a candidate list includes first motion information corresponding to a first reference frame list, or candidate motion information corresponding to a candidate index in a candidate list includes second motion information corresponding to a second reference frame list.

In a possible design, the prediction direction indication information includes a syntax element inter_pred_idc[x0][y0], where:
   inter_pred_idc[x0][y0]=PRED_L0, used to indicate forward prediction;
   inter_pred_idc[x0][y0]=PRED_L1, used to indicate backward prediction; or
   the prediction direction indication information includes predFlagL0 and/or predFlagL1, where:
   predFlagL0=1, and predFlagL1=0, used to indicate forward prediction;
   predFlagL1=1, and predFlagL0=0, used to indicate backward prediction.

It should be noted that the optical flow decision conditions (or constraint conditions for applying PROF) are not limited to the above examples, and additional or different optical flow decision conditions (or constraint conditions for applying PROF) may be set based on different application scenarios. For example, the above conditions (c) to (f) may be replaced with other conditions, such as an optical flow decision condition: PROF may be applied for an affine coded block if all control point MVs of the affine coded block are different from each other or a constraint condition for applying PROF: PROF is not be applied for an affine coded block if all control point MVs of the affine coded block are the same. Such as an optical flow decision condition: PROF may be applied for an affine coded block if the resolution of the current picture and the resolution of reference picture of the affine coded block are the same, e.g. RprConstraintsActive[X][refIdxLX] is equal to 0 or a constraint condition for applying PROF: PROF is not be applied for an affine coded block if the resolution of the current picture and the resolution of reference picture of the affine coded block are different from each other, e.g. RprConstraintsActive[X][refIdxLX] is equal to 1.

In a possible design, in step S1102, the performing optical flow (prediction refinement with optical flow, PROF) processing for one or more sub-blocks (for example, each sub-block or a current sub-block) in the current affine picture block, to obtain a delta prediction value (for example, ΔI(i,j)) of the one or more sub-blocks (for example, each sub-block or the current sub-block) in the current affine picture block may include the following steps:

Step 1. Obtain a second prediction matrix based on motion information (for example, a motion vector) of a current sub-block in the current affine picture block.

For example, an (M+2)*(N+2) prediction block (namely, the second prediction matrix) is obtained through interpolation based on a motion vector of an M×N sub-block. Different implementations are provided above.

Step 2. Calculate a horizontal prediction gradient matrix and a vertical prediction gradient matrix based on the second prediction matrix, where the size of the second prediction matrix is greater than or equal to sizes of the horizontal prediction gradient matrix and the vertical prediction gradient matrix.

Step 3. Calculate a delta prediction value (ΔI(i,j)) of the current sample in the sub-block based on a horizontal prediction gradient value of the current sample in the sub-block in the horizontal prediction gradient matrix, a vertical prediction gradient value of the current sample in the vertical prediction gradient matrix, and a difference between the motion vector of the current sample of the current sub-block and the motion vector of the center sample of the sub-block.

Correspondingly, in step S1102, the obtaining a refined prediction sample value (for example, a prediction signal I'(i,j)) of the sub-block based on the delta prediction value (for example, ΔI(i,j)) of the sub-block and a prediction sample value (for example, a prediction signal I(i,j)) of the sub-block may include:

obtaining a refined prediction sample value (for example, a prediction signal I'(i,j)) of the current sample based on a delta prediction value (for example, ΔI(i,j)) of the current sample in the sub-block and a prediction sample value (for example, a prediction signal I(i,j)) of the current sample.

It should be understood that the prediction sample values (for example, the prediction signal I(i,j)) of the sub-block may be an M×N prediction block in an (M+2)*(N+2) prediction block.

For the step 3, in an implementation, motion vector differences between motion vectors of different samples in the current sub-block and a motion vector of the center sample of the sub-block are different. In another implementation, the motion vector difference between a motion vector of a current sample unit (for example, a 2×2 sample block) containing the current sample and the motion vector of the center sample of the sub-block is used as a motion vector difference between the motion vector of the current sample of the current sub-block and the motion vector of the center sample of the sub-block. In other words, to balance processing overheads and prediction accuracy, assuming that both samples A and B are included in the current sample unit, a motion vector difference between a motion vector of a current sample unit (for example, a 2×2 sample block) and a motion vector of a center sample of the sub-block may be used as a motion vector difference between the motion vector of the sample A in the sub-block and the motion vector of the center sample of the sub-block; Also, a motion vector difference between the motion vector of the current sample unit and the motion vector of the center sample of the sub-block may be used as a motion vector difference between the motion vector of the sample B in the sub-block and the motion vector of the center sample of the sub-block.

In an implementation, the second prediction matrix in the above step 1 is represented by $I_1(p, q)$, where a value range of p is [−1, sbW], and a value range of q is [−1, sbH];

the horizontal prediction gradient matrix is represented by X(i,j), where a value range of i is [0, sbW−1], and a value range of j is [0, sbH−1]; and the vertical prediction gradient matrix is represented by Y(i,j), where a value range of i is [0, sbW−1], and a value range of j is [0, sbH−1]; where sbW represents a width of the current sub-block in the current affine picture block, sbH represents a height of the current sub-block in the current affine picture block, and (x, y) represents location coordinates of each sample (also referred to as a sample) in the current sub-block in the current affine picture block, and the element located at (x, y) may correspond to the element located at (i,j).

Figure 12:
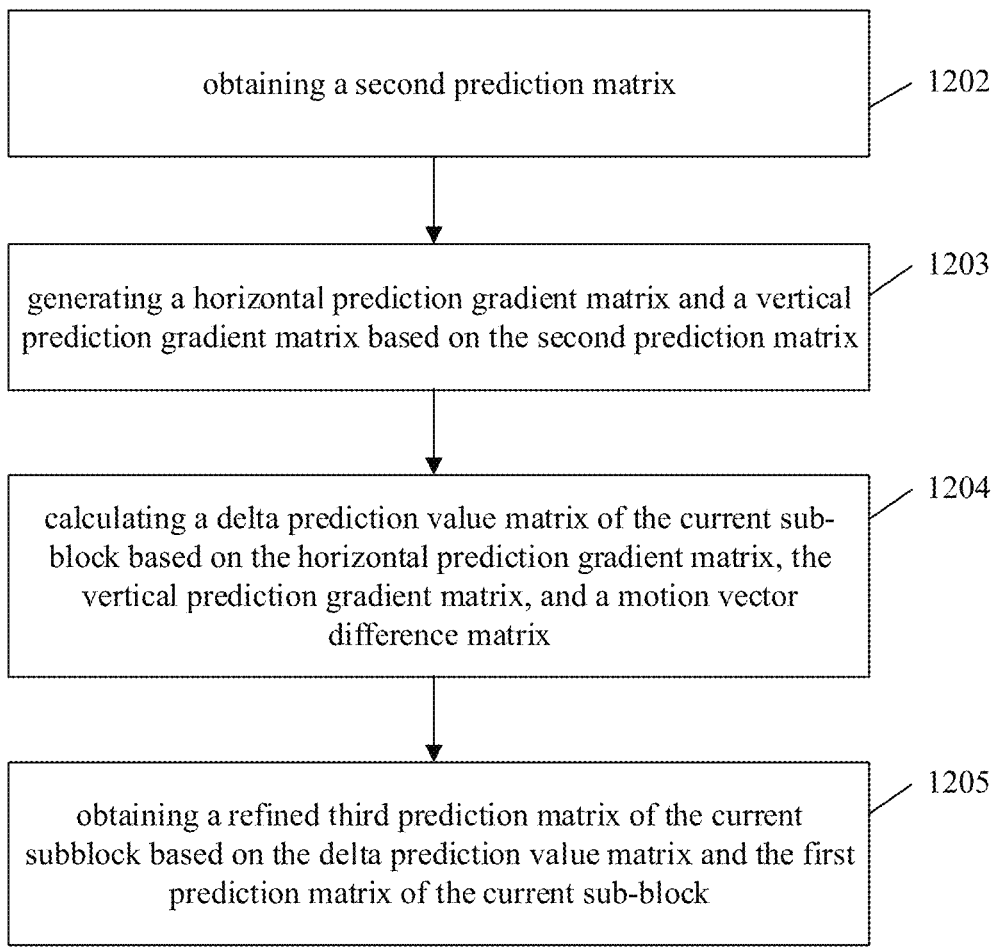
FIG. 12 is a diagram showing a PROF process according to an embodiment of the present disclosure.

In another possible design, in step 1102, the performing optical flow (prediction refinement with optical flow, PROF) processing for one or more sub-blocks (for example, each sub-block) in the current affine picture block, to obtain a delta prediction value (also referred to as a predictor offset value, for example, ΔI(i,j)) of the one or more sub-blocks (for example, each sub-block) in the current affine picture block includes, as shown in FIG. 12:

S1202. obtaining or generating a second prediction matrix based on a first prediction matrix, the first prediction matrix (for example, a first prediction signal I(i,j) or a 4×4 prediction) of the sub-block (for example, each sub-block) corresponds to prediction sample values of the current sub-block. The subblock-based affine motion compensation for a current sub-block of the affine coded block is performed to obtain prediction sample values of the current sub-block of the affine coded block, as shown in FIG. 9A.

S1203. calculating a horizontal prediction gradient matrix and a vertical prediction gradient matrix based on a second prediction matrix, where a size of the second prediction matrix is greater than or equal to a size of the first prediction matrix, and the size of the second prediction matrix is greater than or equal to sizes of the horizontal prediction gradient matrix and the vertical prediction gradient matrix; and S1204. calculating a delta prediction value matrix (for example, ΔI(i,j) of a prediction signal) of the sub-block based on the horizontal prediction gradient matrix, the vertical prediction gradient matrix, and a motion vector difference between the motion vector of the current sample unit (for example, a current sample or a current sample block, such as a 2×2 sample block) of the sub-block and the motion vector of the center sample of the sub-block; and the step of obtaining a refined prediction sample value (for example, a prediction signal I'(i,j)) of the sub-block based on the delta prediction value (for example, ΔI(i,j)) of the sub-block and a prediction sample value (for example, a prediction signal I(i,j)) of the sub-block includes:

S1205. obtaining a refined third prediction matrix (for example, a prediction signal I'(i,j)) of the sub-block based on the delta prediction value matrix (for example, ΔI(i,j)) and the first prediction matrix (for example, the prediction signal I(i,j)).

It should be understood that, I(i,j) herein represents a prediction sample value (for example, an original prediction obtained through motion compensation) of the current sample in the current sub-block, ΔI(i,j) represents a delta prediction value of the current sample in the current sub-block, and I'(i,j) represents a refined prediction sample value of the current sample in the current sub-block. For example, the original prediction sample value+the delta prediction value=the refined prediction sample value. It should be understood that obtaining refined prediction sample values of a plurality of samples (for example, all samples) in the current sub-block is equivalent to obtaining refined prediction sample values of the current sub-block.

In different possible implementations, a gradient value may be calculated sample by sample and a delta prediction value may be calculated sample by sample. Alternatively, a gradient value matrix may be obtained and then a delta prediction value may be calculated. This is not limited in this application. In an alternative implementation, the first prediction matrix and the second prediction matrix represent a same prediction matrix.

For a case in which the size of the second prediction matrix is equal to the size of the first prediction matrix and the size of the second prediction matrix is equal to the sizes of the horizontal prediction gradient matrix and the vertical prediction gradient matrix, in a possible implementation, a (w−2)*(h−2) gradient matrix is calculated by using a w*h prediction matrix, and the gradient matrix is padded to obtain a size of w*h, where w*h represents a size of the current sub-block. For example, both the first prediction matrix and the second prediction matrix are prediction matrices whose sizes are w*h or the first prediction matrix and the second prediction matrix represent a same prediction matrix.

As shown in FIG. 11i, another embodiment of this application provides another method for prediction refinement with optical flow (PROF) for an affine coded block, including the following steps:

S1110. It is determined whether a plurality of optical flow decision conditions are fulfilled or satisfied or not. Here the optical flow decision conditions refer to the conditions allowing for the application of PROF.

S1111. If the plurality of optical flow decision conditions are fulfilled, a first indicator (for example, applyProfFlag) is set equal to true, and performing a prediction refinement with optical flow (PROF) process for a current sub-block of the affine coded block, to obtain refined prediction sample values of the current sub-block of the affine coded block. In step S1111, optical flow (prediction refinement with optical flow, PROF) processing is performed for one or more sub-blocks (for example, each sub-block) in the current affine picture block, to obtain a delta prediction value (also referred to as a predictor offset value, for example, ΔI(i,j)) of the one or more sub-blocks (for example, each sub-block) in the current affine picture block.

In step S1111, a refined prediction sample value (for example, a prediction signal I'(i,j)) of the sub-block is obtained based on the delta prediction value (for example, ΔI(i,j)) and a prediction sample value (for example, a prediction signal I(i,j)) of the sub-block.

It should be understood that, I(i,j) herein represents a prediction sample value (for example, an original prediction sample value obtained through motion compensation) of the current sample in the current sub-block, ΔI(i,j) represents a delta prediction value of the current sample in the current sub-block, and I'(i,j) represents a refined prediction sample value of the current sample in the current sub-block. For example, the original prediction sample value+the delta prediction value=the refined prediction sample value. It should be understood that obtaining refined prediction sample values of a plurality of samples (for example, all samples) in the current sub-block is equivalent to obtaining refined prediction sample values of the current sub-block.

It can be understood that when the refined prediction sample values of each sub-block of the affine coded block are generated, the refined prediction sample values of the affine coded block are naturally generated. S1113, when the at least one of the plurality of optical flow decision conditions is not fulfilled or satisfied, a first indicator (for example, applyProfFlag) is set equal to false, and the PROF process is skipped.

It can be understood that if constraint conditions for applying PROF are used to determine whether to apply PROF, the step S1110 will be changed to determining whether none of a plurality of the constraint conditions for applying PROF is fulfilled. In this case, the step S1111 will be changed to: if none of a plurality of the constraint conditions for applying PROF is fulfilled or satisfied, a first indicator (for example, applyProfFlag) is set equal to true, and performing a prediction refinement with optical flow (PROF) process for a current sub-block of the affine coded block, to obtain refined prediction sample values of the current sub-block of the affine coded block. Accordingly, the step S1113 will be changed to: if at least one of the plurality of the constraint conditions for applying PROF is fulfilled, the first indicator (for example, applyProfFlag) is set equal to false, and the PROF process is skipped.

In an implementation, if the first indicator (for example, applyProfFlag) is a first value (for example, 1), performing optical flow (for example, PROF) processing for the one or more sub-blocks (for example, each sub-block) in the current affine picture block; or, Otherwise, if the first indicator (for example, applyProfFlag) is a second value (for example, 0), skipping performing optical flow (for example, PROF) processing for the one or more sub-blocks (for example, each sub-block) in the current affine picture block.

In an implementation, a value of the first indicator depends on whether the optical flow decision conditions are fulfilled or not, where the optical flow decision conditions includes one or more of the following:

first indication information (for example, sps_prof_enabled_flag or sps_bdof_enabled_flag) is used to indicate that PROF is enabled for a current picture unit. It should be noted that the current picture unit herein may be, for example, a current sequence, a current picture, a current slice, or a current tile group. These examples of the current picture unit are not limiting.

second indication information (for example, fallbackModeTriggered) is used to indicate to partition the current affine picture block;

the current affine picture block is a uni-prediction affine picture block;

a size of the sub-block in the affine picture block is greater than N×N, wherein N=4;

the current affine picture block is a uni-prediction affine picture block and a size of the sub-block in the affine picture block is equal to N×N, wherein N=4; or the current affine picture block is a bi-prediction affine picture block and a size of the sub-block in the affine picture block is greater than N×N, wherein N=4.

It should be noted that this application includes but is not limited to the foregoing optical flow decision conditions, and additional or different optical flow decision conditions may be set based on different application scenarios.

In this embodiment of this application, for example, when all the following conditions are met, applyProfFlag is set to 1:

sps_prof_enabled_flag==1
fallbackModeTriggered==0
inter_pred_idc[x0][y0]=PRED_L0 or PRED_L1; (or predFlagL0=1, predFlagL1=0; or predFlagL1=1, predFlagL0=0)
Other conditions In another embodiment, for example, when all the following conditions are met, applyProfFlag is set to 1:

sps_prof_enabled_flag==1
fallbackModeTriggered==0
other conditions

It can be understood that if constraint conditions for applying PROF are used in S1110 instead of the optical flow decision conditions, when none of all the following constraint conditions are met, applyProfFlag is set to 1:

sps_prof_disabled_flag==1
fallbackModeTriggered==1
other conditions

It should be understood that, for details about an execution entity of the steps in the prediction method provided in this embodiment of this application and extensions and variations of these steps, refer to the foregoing descriptions of the corresponding methods. For brevity, details are not described in this specification again.

Another embodiment of this application further provides another PROF process, including:

obtaining a first prediction matrix of the M*N block based on motion information (for example, a motion vector) of a plurality of sub-blocks in a current affine picture block; for example, M*N block is 16*16, as shown in FIG. 9E. for example, the 16*16 block (or the 16*16 window) includes 16 of 4*4 subblocks.

calculating a horizontal prediction gradient matrix and a vertical prediction gradient matrix based on a second prediction matrix, where a size of the second prediction matrix is greater than or equal to a size of the first prediction matrix, and the size of the second prediction matrix is greater than or equal to sizes of the horizontal prediction gradient matrix and the vertical prediction gradient matrix; and calculating a delta prediction value matrix (for example, $\Delta I(i,j)$ of a prediction signal) of the M*N block based on the horizontal prediction gradient matrix, the vertical prediction gradient matrix, and a motion vector difference between a motion vector of the current pixel unit (for example, a current pixel or a current pixel block, such as a 2×2 pixel block) in the M*N block and a motion vector of a center pixel of the M*N block; and obtaining a refined third prediction matrix (for example, a prediction signal $I'(i,j)$) of the M*N block based on the delta prediction value matrix (for example, $\Delta I(i,j)$) and the first prediction matrix (for example, the prediction signal $I(i,j)$).

In another possible design, the first prediction matrix is represented by $I_1(i,j)$, where a value range of i is [0, size w−1], and a value range of j is [0, size h−1];

the second predictor matrix is represented by $I_2(i,j)$, where a value range of i is [−1, size_w], and a value range of j is [−1, size_h], where size_w=min(W, m), size_h=min(H, m), and m=16;

the horizontal prediction gradient matrix is represented by X(i,j), where a value range of i is [0, size_w−1], and a value range of j is [0, size h−1]; and the vertical prediction gradient matrix is represented by Y(i,j), where a value range of i is [0, size_w−1], and a value range of j is [0, size_h−1]; where W represents a width of the current affine picture block, H represents a height of the current affine picture block, and (x, y) represents location coordinates of each sample in the current affine picture block.

It should be understood that, as shown in FIG. 9E, in some examples, an affine picture block is implicitly partitioned into 16×16 blocks, and a gradient matrix is calculated for each 16×16 block. Correspondingly, the second prediction matrix is represented by $I_2(i,j)$, where a value range of i is [−1, size_w], and a value range of j is [−1, size_h], where size_w=min(w, m), size_h=min(h, m), and m=16. The horizontal prediction gradient matrix is represented by X(i,j), where a value range of i is [0, size_w−1], and a value range of j is [0, size_h−1]. The vertical prediction gradient matrix is represented by Y(i,j), where a value range of i is [0, size_w−1], and a value range of j is [0, size_h−1].

In another possible design, the calculating a horizontal prediction gradient matrix and a vertical prediction gradient matrix (for example, size_w*size_h gradient values) based on a second prediction matrix (for example, a (size_w+2)* (size_h+2) prediction signal) includes:

calculating the horizontal prediction gradient matrix and the vertical prediction gradient matrix based on the second prediction matrix, where the horizontal prediction gradient matrix and the vertical prediction gradient matrix include: a horizontal prediction gradient matrix and a vertical prediction gradient matrix of the sub-block, respectively, where the second prediction matrix is represented by $I_2(i,j)$, where a value range of i is [−1, size_w], and a value range of j is [−1, size_h], where size_w=min(W, m), size_h=min(H, m), and m=16;

the horizontal prediction gradient matrix is represented by X(i,j), where a value range of i is [0, size_w−1], and a value range of j is [0, size_h−1]; and the vertical prediction gradient matrix is represented by Y(i,j), where a value range of i is [0, size_w−1], and a value range of j is [0, size_h−1]; where W represents a width of the current affine picture block, H represents a height of the current affine picture block, and (i,j) represents location coordinates of each sample in the current affine picture block.

It can be learned from the foregoing description that the current affine picture block is implicitly partitioned into 16×16 blocks, and a gradient matrix is calculated for each 16×16 block. It should be understood that m=16 is used merely as an example herein and should not be construed as limiting. Various other values of m can be used, such as m=32.

In a possible design, the method is used for uni-prediction; and the motion information includes first motion information corresponding to a first reference frame list, or second motion information corresponding to a second reference frame list; and the first prediction matrix includes (is) a first initial prediction matrix or a second initial prediction matrix, where the first initial prediction matrix is obtained based on the first motion information, and the second initial prediction matrix is obtained based on the second motion information;

the horizontal prediction gradient matrix includes (is) a first horizontal prediction gradient matrix or a second horizontal prediction gradient matrix, where the first horizontal prediction gradient matrix is obtained through calculation based on an extended first initial prediction matrix, and the second horizontal prediction gradient matrix is obtained through calculation based on an extended second initial prediction matrix;

the vertical prediction gradient matrix includes (is) a first vertical prediction gradient matrix or a second vertical prediction gradient matrix, where the first vertical prediction gradient matrix is obtained through calculation based on an extended first initial prediction matrix, and the second vertical prediction gradient matrix is obtained through calculation based on an extended second initial prediction matrix; and the delta prediction value matrix includes (is) a first delta prediction value matrix corresponding to the first reference frame list or a second delta prediction value matrix corresponding to the second reference frame list, where the first delta prediction value matrix is obtained through calculation based on the first horizontal prediction gradient matrix, the first vertical prediction gradient matrix, and a first motion vector difference (for example, a forward motion vector difference) of each sample unit in the sub-block relative to the center sample of the sub-block, and the second delta prediction value matrix is obtained through calculation based on the second horizontal prediction gradient matrix, the second vertical prediction gradient matrix, and a second motion vector difference (for example, a backward motion vector difference) of each sample unit in the sub-block relative to the center sample of the sub-block.

In a possible design, the method is used for bi-prediction, and the motion information includes first motion information corresponding to a first reference frame list and second motion information corresponding to a second reference frame list; and the first prediction matrix includes a first initial prediction matrix and a second initial prediction matrix, where the first initial prediction matrix is obtained based on the first motion information, and the second initial prediction matrix is obtained based on the second motion information;

the horizontal prediction gradient matrix includes a first horizontal prediction gradient matrix and a second horizontal prediction gradient matrix, the first horizontal prediction gradient matrix is obtained through calculation based on an extended first initial prediction matrix, and the second horizontal prediction gradient matrix is obtained through calculation based on an extended second initial prediction matrix;

the vertical prediction gradient matrix includes a first vertical prediction gradient matrix and a second vertical prediction gradient matrix, where the first vertical prediction gradient matrix is obtained through calculation based on an extended first initial prediction matrix, and the second vertical prediction gradient matrix is obtained through calculation based on an extended second initial prediction matrix; and the delta prediction value matrix includes a first delta prediction value matrix corresponding to the first reference frame list and a second delta prediction value matrix corresponding to the second reference frame list, where the first delta prediction value matrix is obtained through calculation based on the first horizontal prediction gradient matrix, the first vertical prediction gradient matrix, and a first motion vector difference (for example, a forward motion vector difference) of each sample unit in the sub-block relative to the center sample of the sub-block, and the second delta prediction value matrix is obtained through calculation based on the second horizontal prediction gradient matrix, the second vertical prediction gradient matrix, and a second motion vector difference (for example, a backward motion vector difference) of each sample unit in the sub-block relative to the center sample of the sub-block.

In a possible design, the method is used for uni-prediction;

the motion information includes first motion information corresponding to a first reference frame list or second motion information corresponding to a second reference frame list; and the first prediction matrix includes (is) a first initial prediction matrix or a second initial prediction matrix, where the first initial prediction matrix is obtained based on the first motion information, and the second initial prediction matrix is obtained based on the second motion information.

In a possible design, the method is used for bi-prediction; the motion information includes first motion information corresponding to a first reference frame list and second motion information corresponding to a second reference frame list; and the first prediction matrix includes the first initial prediction matrix and the second initial prediction matrix, where the first initial prediction matrix is obtained based on the first motion information, and the second initial prediction matrix is obtained based on the second motion information; and the obtaining a prediction matrix of the sub-block based on the motion information of the sub-block includes:

performing weighted summation on sample values at a same location in the first initial prediction matrix and the second initial prediction matrix, to obtain the prediction matrix of the sub-block. It should be understood that, before weighted summation is performed herein, sample values in the first initial prediction matrix and the second initial prediction matrix may be separately refined.

In another possible design, the PROF process is described as following four steps.

Step 1) The sub-block-based affine motion compensation is performed to generate sub-block prediction I(i,j). For example, i has a value from [0, subW+1] or [−1, subW], and j has a value from [0, subH+1] or [−1,subH]. It can be understood that the top-left sample (or the origin of coordinates) is located at (1, 1) for i has a value from [0, subW+1] and j has a value from [0, subH+1]; while, the top-left sample is located at (0, 0) for i has a value from [−1, subW] and j has a value from [−1,subH].

Step 2) The spatial gradients $g_x(i,j)$ and $g_y(i,j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one sample on each side for the gradient calculation. To reduce the memory bandwidth and complexity, the samples on the extended borders are copied from the nearest integer sample position in the reference picture. Therefore, additional interpolation for padding region is avoided.

Step 3) The luma prediction refinement is calculated by the optical flow equation.

$$\Delta I(i,j)=g_x(i,j)*\Delta v_x(i,j)+g_y(i,j)*\Delta v_y(i,j)$$

where the $\Delta v(i,j)$ is the difference between sample MV computed for sample location (i,j), denoted by v(i,j), and the sub-block MV of the sub-block to which sample (i,j) belongs, as shown in FIG. 10.

In other words, an MV of each 4×4 center sample is calculated, and then an MV of each sample of the sub-block is calculated. The difference $\Delta v(i,j)$ between the MV of each sample and the MV of the center sample can be obtained.

Since the affine model parameters and the sample location relative to the sub-block center are not changed from sub-block to sub-block, $\Delta v(i,j)$ can be calculated for the first sub-block, and reused for other sub-blocks in the same CU. Let x and y be the horizontal and vertical offset from the sample location to the center of the sub-block, $\Delta v(x,y)$ can be derived by the following equation, $$\begin{cases} \Delta v_x(x,y) = c*x + d*y \\ \Delta v_y(x,y) = e*x + f*y \end{cases}$$

For 4-Parameter Affine Model, $$\begin{cases} c = f = \dfrac{v_{1x} - v_{0x}}{w} \\ e = -d = \dfrac{v_{1y} - v_{0y}}{w} \end{cases}$$

For 6-Parameter Affine Model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i,j). The final prediction I' is generated as shown in the following equation.

$$I'(i,j) = I(i,j) + \Delta I(i,j)$$

Figure 15:
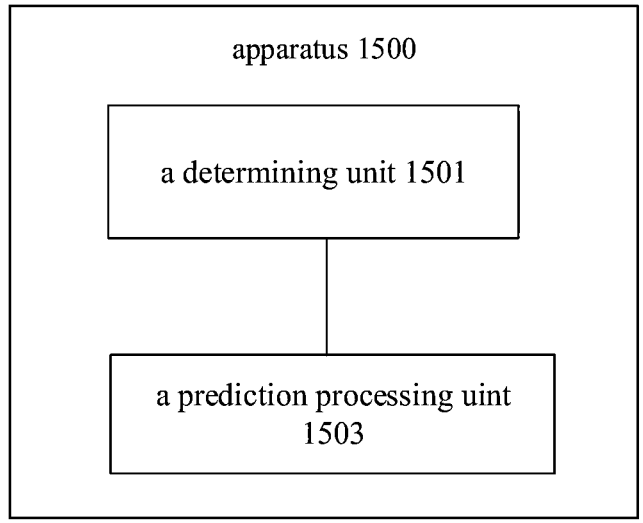
FIG. 15 is a block diagram showing an example structure of an apparatus for prediction refinement with optical flow (PROF) for an affine coded block of a video signal according to some aspects of the present disclosure.

FIG. 15 illustrates an apparatus 1500 for prediction refinement with optical flow (PROF) for an affine coded block according to another aspect of the disclosure. In an example, the apparatus 1500 comprises:

- a determining unit 1501 configured for determining that none of the plurality of constraint conditions for applying PROF are fulfilled;
  - a prediction processing unit 1503 configured for performing a prediction refinement with optical flow, PROF process for a current sub-block of the affine coded block, to obtain refined prediction sample values of the current sub-block of the affine coded block. It can be understood that when the refined prediction sample values of each sub-block of the affine coded block are generated, the refined prediction sample values of the affine coded block are naturally generated.

In another example, the apparatus 1500 comprises:

- a determining unit 1501 configured for determining that a plurality of optical flow decision conditions are fulfilled; Here, the plurality of optical flow decision conditions refer to the conditions allowing for the application of PROF.
  - a prediction processing unit 1503 configured for performing a PROF process for a current sub-block of the affine coded block, to obtain refined prediction sample values of the current sub-block of the affine coded block. It can be understood that when the refined prediction sample values of each sub-block of the affine coded block are generated, the refined prediction sample values of the affine coded block are naturally generated.

Correspondingly, in an example, an example structure of the apparatus 1500 may be corresponding to encoder 20 in FIG. 2. In another example, an example structure of the apparatus 1500 may be corresponding to the decoder 30 in FIG. 3.

In another example, an example structure of the apparatus 1500 may be corresponding to the inter prediction unit 244 in FIG. 2. In another example, an example structure of the apparatus 1500 may be corresponding to the inter prediction unit 344 in FIG. 3.

It may be understood that the determining unit and the prediction processing unit (corresponding to an inter prediction module) in the encoder 20 or the decoder 30 provided in this embodiment of this application is a functional entity for implementing various execution steps included in the foregoing corresponding method, that is, has a functional entity for completely implementing steps in the method in this application and extensions and variations of these steps. For details, refer to the foregoing descriptions of the corresponding method. For brevity, details are not described herein again.

Following is an explanation of the applications of the encoding method as well as the decoding method as shown in the above-mentioned embodiments, and a system using them.

Figure 16:
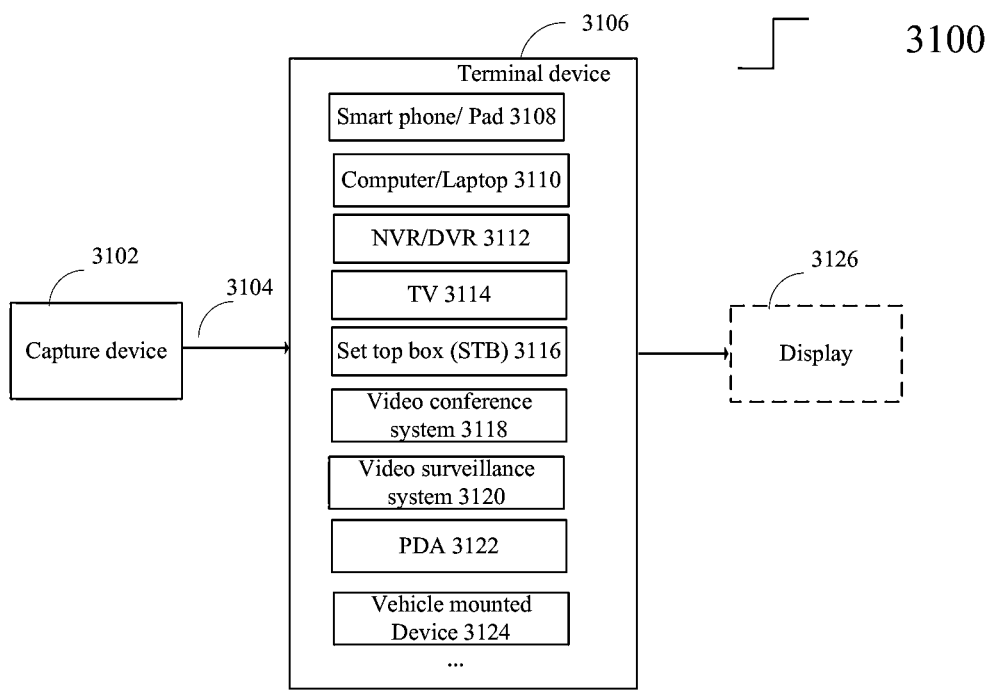
FIG. 16 is a block diagram showing an example structure of a content supply system which realizes a content delivery service.

FIG. 16 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 17:
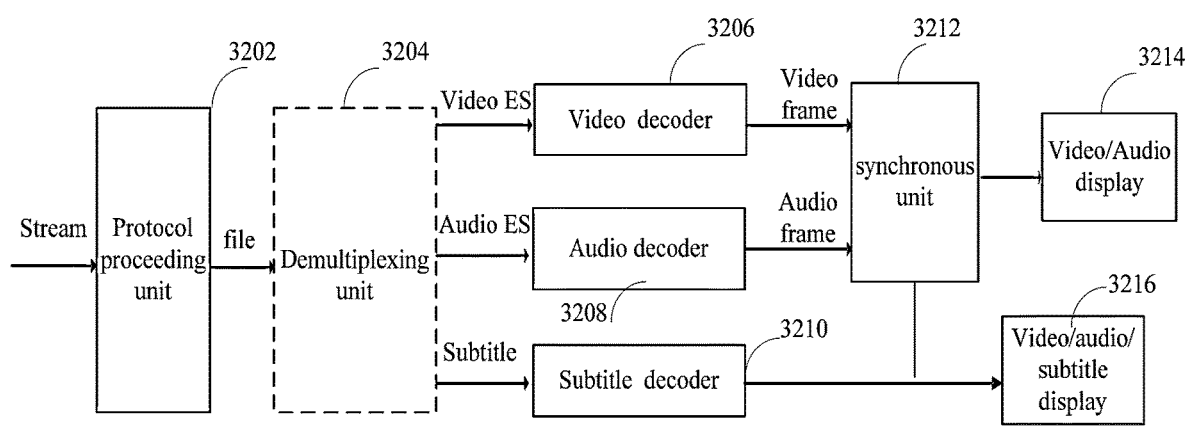
FIG. 17 is a block diagram showing a structure of an example of a terminal device.

FIG. 17 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

The mathematical operators used in this application are similar to those used in the C programming language. However, the results of integer division and arithmetic shift operations are defined more precisely, and additional operations are defined, such as exponentiation and real-valued division.

For explanations of related content in this embodiment, implementations of related steps, beneficial effects, and the like, refer to the foregoing corresponding parts, or simple modifications may be made based on the foregoing corresponding parts. Details are not described herein again.

It should be noted that, in a case in which no conflict occurs, some features in any two or more of the foregoing embodiments may be combined to form a new embodiment. In addition, some features in any one of the foregoing embodiments may be independently used as an embodiment.

The foregoing mainly describes the solutions provided in the embodiments of this application from a perspective of the methods. To implement the foregoing functions, corresponding hardware structures and/or software modules for performing the functions are included. A person skilled in the art should easily be aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Division of an encoder/a decoder into functional modules in the embodiments of this application may be performed based on the foregoing method examples. For example, each functional module may be obtained through division in correspondence to each function, or at least two functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for performing a prediction refinement with optical flow (PROF) process for a current sub-block of an affine coded block implemented by a coding device, comprising:
    when a plurality of constraint conditions for applying PROF are not fulfilled for the affine coded block, performing the PROF process for the current sub-block of the affine coded block to obtain refined prediction sample values of the current sub-block of the affine coded block by
        performing an optical flow processing for the current sub-block of the affine coded block to obtain a delta prediction value of a current sample of the current sub-block; and
        obtaining a refined prediction sample value of the current sample based on the delta prediction value of the current sample and a prediction sample value of the current sample of the current sub-block;
    wherein the plurality of constraint conditions for applying PROF comprises:
    first indication information indicating that PROF is disabled for a picture containing the affine coded block or indicating that the PROF is disabled for slices associated with a picture containing the affine coded block; and
    second indication information indicating no partition of the affine coded block.

2. The method according to claim 1, wherein
    before the performing the PROF process for the current sub-block of the affine coded block, the method further comprises: determining that the plurality of constraint conditions for applying PROF are not fulfilled for the affine coded block.

3. The method according to claim 1, wherein one of the plurality of constraint conditions for applying PROF is that a variable fallbackModeTriggered is set to 1.

4. The method according to claim 1, wherein the performing the optical flow processing for the current sub-block to obtain the delta prediction value of the current sample of the current sub-block comprises:
    obtaining a second prediction matrix, wherein the second prediction matrix is generated based on motion information of the current sub-block;
    generating a horizontal prediction gradient matrix and a vertical prediction gradient matrix based on the second prediction matrix, wherein the horizontal prediction gradient matrix and the vertical prediction gradient matrix have a same size and a size of the second prediction matrix is greater than or equal to the size of the horizontal prediction gradient matrix and the vertical prediction gradient matrix; and
    calculating the delta prediction value of the current sample of the current sub-block based on a horizontal prediction gradient value of the current sample in the horizontal prediction gradient matrix, a vertical prediction gradient value of the current sample in the vertical prediction gradient matrix, and a difference between a motion vector of the current sample of the current sub-block and a motion vector of a center sample of the current sub-block.

5. The method according to claim 4, wherein the obtaining the second prediction matrix comprises:
generating a first prediction matrix based on motion information of the current sub-block, wherein elements of the first prediction matrix correspond to prediction sample values of the current sub-block, and generating the second prediction matrix based on the first prediction matrix.

6. The method according to claim 4, wherein
an element of the second prediction matrix is represented by $I_1(p, q)$, wherein a value range of p is [−1, sbW], and a value range of q is [−1, sbH],
an element of the horizontal prediction gradient matrix is represented by X(i,j) and corresponds to sample (i,j) of the current sub-block in the affine coded block, wherein a value range of i is [0, sbW−1], and a value range of j is [0, sbH−1],
an element of the vertical prediction gradient matrix is represented by Y(i,j) and corresponds to sample (i,j) of the current sub-block in the affine coded block, wherein a value range of i is [0, sbW−1], and a value range of j is [0, sbH−1], and wherein
sbW represents a width of the current sub-block in the affine coded block, and sbH represents a height of the current sub-block in the affine coded block.

7. The method according to claim 1, further comprising:
before the performing the PROF process for the current sub-block of the affine coded block, performing sub-block-based affine motion compensation for the current sub-block of the affine coded block to obtain prediction sample values of the current sub-block.

8. A method for performing a prediction refinement with optical flow (PROF) process for a current sub-block of an affine coded block implemented by a coding device, comprising:
when a plurality of optical flow decision conditions are fulfilled for the affine coded block, performing the PROF process for the current sub-block of the affine coded block to obtain refined prediction sample values of the current sub-block of the affine coded block by
performing an optical flow processing for the current sub-block of the affine coded block to obtain a delta prediction value of a current sample of the current sub-block; and
obtaining a refined prediction sample value of the current sample based on the delta prediction value of the current sample and a prediction sample value of the current sample of the current sub-block;
wherein the plurality of optical flow decision conditions comprises:
first indication information indicating that PROF is enabled for a picture containing the affine coded block or indicating that PROF is enabled for slices associated with a picture containing the affine coded block; and
second indication information indicating partition is applied to the affine coded block.

9. The method according to claim 8, further comprising:
before the performing the PROF process for the current sub-block of the affine coded block,
determining that the plurality of optical flow decision conditions are fulfilled for the affine coded block.

10. The method according to claim 8, wherein one of the plurality of the optical flow decision conditions is that a variable fallbackModeTriggered is set to 0.

11. The method according to claim 8, wherein the performing the optical flow processing for the current sub-block to obtain the delta prediction value of the current sample of the current sub-block comprises:
obtaining a second prediction matrix, wherein the second prediction matrix is generated based on motion information of the current sub-block;
generating a horizontal prediction gradient matrix and a vertical prediction gradient matrix based on the second prediction matrix, wherein the horizontal prediction gradient matrix and the vertical prediction gradient matrix have a same size and a size of the second prediction matrix is greater than or equal to the size of the horizontal prediction gradient matrix and the vertical prediction gradient matrix; and
calculating the delta prediction value of the current sample of the current sub-block based on a horizontal prediction gradient value of the current sample in the horizontal prediction gradient matrix, a vertical prediction gradient value of the current sample in the vertical prediction gradient matrix, and a difference between a motion vector of the current sample of the current sub-block and a motion vector of a center sample of the sub-block.

12. The method according to claim 11, wherein the obtaining the second prediction matrix, comprises:
generating a first prediction matrix based on motion information of the current sub-block, wherein elements of the first prediction matrix correspond to prediction sample values of the current sub-block, and generating the second prediction matrix based on the first prediction matrix.

13. The method according to claim 11, wherein
an element of the second prediction matrix is represented by $I_1(p, q)$, wherein a value range of p is [−1, sbW], and a value range of q is [−1, sbH],
an element of the horizontal prediction gradient matrix is represented by X(i,j) and corresponds to sample (i,j) of the current sub-block in the affine coded block, wherein a value range of i is [0, sbW−1], and a value range of j is [0, sbH−1],
an element of the vertical prediction gradient matrix is represented by Y(i,j) and corresponds to sample (i,j) of the current sub-block in the affine coded block, wherein a value range of i is [0, sbW−1], and a value range of j is [0, sbH−1], and wherein
sbW represents a width of the current sub-block in the affine coded block, and sbH represents a height of the current sub-block in the affine coded block.

14. The method according to claim 8, further comprising:
before the performing the PROF process for the current sub-block of the affine coded block, performing sub-block-based affine motion compensation for the current sub-block of the affine coded block to obtain prediction sample values of the current sub-block.

15. An apparatus for performing a prediction refinement with optical flow (PROF) process for a current sub-block of an affine coded block, comprising:
one or more electronic circuits or processors configured to:
perform, when a plurality of constraint conditions for applying PROF are not fulfilled for the affine coded block, the PROF process for the current sub-block of the affine coded block to obtain refined prediction sample values of the current sub-block of the affine coded block by performing an optical flow processing for the current sub-block of the affine coded block to obtain a delta prediction value of a current sample of the current sub-block; and obtaining a refined prediction sample value of the current sample based on the delta prediction value of the current sample and a prediction sample value of the current sample of the current sub-block;

wherein the plurality of constraint conditions for applying PROF comprises:

first indication information indicating that PROF is disabled for a picture containing the affine coded block or indicating that the PROF is disabled for slices associated with a picture containing the affine coded block; and second indication information indicating no partition of the affine coded block.

16. The apparatus according to claim 15, wherein the one or more electronic circuits or processors are further configured to determine that the plurality of constraint conditions for applying PROF are not fulfilled for the affine coded block.

17. The apparatus according to claim 15, wherein one of the plurality of constraint conditions for applying PROF is that a variable fallbackModeTriggered is set to 1.

18. The apparatus according to claim 15, wherein the one or more electronic circuits or processors are further configured to:

obtain a second prediction matrix, wherein the second prediction matrix is generated based on motion information of the current sub-block;

generate a horizontal prediction gradient matrix and a vertical prediction gradient matrix based on the second prediction matrix, wherein the horizontal prediction gradient matrix and the vertical prediction gradient matrix have a same size and a size of the second prediction matrix is greater than or equal to the size of the horizontal prediction gradient matrix and the vertical prediction gradient matrix; and calculate the delta prediction value of the current sample of the current sub-block based on a horizontal prediction gradient value of the current sample in the horizontal prediction gradient matrix, a vertical prediction gradient value of the current sample in the vertical prediction gradient matrix, and a difference between a motion vector of the current sample of the current sub-block and a motion vector of a center sample of the current sub-block.

19. The apparatus according to claim 18, wherein the one or more electronic circuits or processors are further configured to:

generate a first prediction matrix based on motion information of the current sub-block, wherein elements of the first prediction matrix correspond to prediction sample values of the current sub-block, and generating the second prediction matrix based on the first prediction matrix; or generate the second prediction matrix based on the motion information of the current sub-block.

20. The apparatus according to claim 18, wherein an element of the second prediction matrix is represented by $I_1(p, q)$, wherein a value range of p is [−1, sbW], and a value range of q is [−1, sbH], an element of the horizontal prediction gradient matrix is represented by $X(i,j)$ and corresponds to sample (i,j) of the current sub-block in the affine coded block, wherein a value range of i is [0, sbW−1], and a value range of j is [0, sbH−1], an element of the vertical prediction gradient matrix is represented by $Y(i,j)$ and corresponds to sample (i,j) of the current sub-block in the affine coded block, wherein a value range of i is [0, sbW−1], and a value range of j is [0, sbH−1], and wherein sbW represents a width of the current sub-block in the affine coded block, and sbH represents a height of the current sub-block in the affine coded block.

21. The apparatus according to claim 15, wherein the one or more electronic circuits or processors are further configured to:

perform subblock-based affine motion compensation for the current sub-block of the affine coded block to obtain prediction sample values of the current sub-block.

22. An apparatus for performing a prediction refinement with optical flow (PROF) process for a current sub-block of an affine coded block, comprising:

one or more electronic circuits or processors configured to:

perform, when a plurality of optical flow decision conditions are fulfilled for the affine coded block, the PROF process for the current sub-block of the affine coded block to obtain refined prediction sample values of the current sub-block of the affine coded block by perform an optical flow processing for the current sub-block of the affine coded block to obtain a delta prediction value of a current sample of the current sub-block; and obtain a refined prediction sample value of the current sample based on the delta prediction value of the current sample and a prediction sample value of the current sample of the current sub-block;

wherein the plurality of optical flow decision conditions comprises:

first indication information indicating that PROF is enabled for a picture containing the affine coded block or indicating that PROF is enabled for slices associated with a picture containing the affine coded block; and second indication information indicating partition is applied to the affine coded block.

23. The apparatus according to claim 22, wherein the one or more electronic circuits or processors are further configured to:

determine that the plurality of optical flow decision conditions are fulfilled for the affine coded block.

24. The apparatus according to claim 22, wherein one of the plurality of the optical flow decision conditions is that a variable fallbackModeTriggered is set to 0.

25. The apparatus according to claim 22, wherein the one or more electronic circuits or processors are further configured to obtain a second prediction matrix, wherein the second prediction matrix is generated based on motion information of the current sub-block;

generate a horizontal prediction gradient matrix and a vertical prediction gradient matrix based on the second prediction matrix, wherein the horizontal prediction gradient matrix and the vertical prediction gradient matrix have a same size and a size of the second prediction matrix is greater than or equal to the size of the horizontal prediction gradient matrix and the vertical prediction gradient matrix; and calculate the delta prediction value of the current sample of the current sub-block based on a horizontal prediction gradient value of the current sample in the horizontal prediction gradient matrix, a vertical prediction gradient value of the current sample in the vertical prediction gradient matrix, and a difference between a motion vector of the current sample of the current sub-block and a motion vector of a center sample of the sub-block.

26. The apparatus according to claim 25, wherein the one or more electronic circuits or processors are further configured to:
generate a first prediction matrix based on motion information of the current sub-block, wherein elements of the first prediction matrix correspond to prediction sample values of the current sub-block, and generating the second prediction matrix based on the first prediction matrix.

27. The apparatus according to claim 25, wherein
an element of the second prediction matrix is represented by $I_1(p, q)$, wherein a value range of p is [−1, sbW], and a value range of q is [−1, sbH],
an element of the horizontal prediction gradient matrix is represented by $X(i,j)$ and corresponds to sample (i,j) of the current sub-block in the affine coded block, wherein a value range of i is [0, sbW−1], and a value range of j is [0, sbH−1],
an element of the vertical prediction gradient matrix is represented by $Y(i,j)$ and corresponds to sample (i,j) of the current sub-block in the affine coded block, wherein a value range of i is [0, sbW−1], and a value range of j is [0, sbH−1], and wherein
sbW represents a width of the current sub-block in the affine coded block, and sbH represents a height of the current sub-block in the affine coded block.

28. The apparatus according to claim 22, wherein the one or more electronic circuits or processors are further configured to:
perform subblock-based affine motion compensation for the current sub-block of the affine coded block to obtain prediction sample values of the current sub-block.

29. A non-transitory computer-readable media storing computer instructions for performing a prediction refinement with optical flow (PROF) process for a current sub-block of an affine coded block, that when executed by one or more processors, cause the one or more processors to perform the operations of:
when a plurality of constraint conditions for applying PROF are not fulfilled for the affine coded block, performing the PROF process for the current sub-block of the affine coded block to obtain refined prediction sample values of the current sub-block of the affine coded block by
performing an optical flow processing for the current sub-block of the affine coded block to obtain a delta prediction value of a current sample of the current sub-block; and
obtaining a refined prediction sample value of the current sample based on the delta prediction value of the current sample and a prediction sample value of the current sample of the current sub-block;
wherein the plurality of constraint conditions for applying PROF comprises:
first indication information indicating that PROF is disabled for a picture containing the affine coded block or indicating that the PROF is disabled for slices associated with a picture containing the affine coded block; and
second indication information indicating no partition of the affine coded block.

30. A non-transitory computer-readable media storing computer instructions for performing a prediction refinement with optical flow (PROF) process for a current sub-block of an affine coded block, that when executed by one or more processors, cause the one or more processors to perform the operations of:
when a plurality of optical flow decision conditions are fulfilled for the affine coded block, performing the PROF process for the current sub-block of the affine coded block to obtain refined prediction sample values of the current sub-block of the affine coded block by
performing an optical flow processing for the current sub-block of the affine coded block to obtain a delta prediction value of a current sample of the current sub-block; and
obtaining a refined prediction sample value of the current sample based on the delta prediction value of the current sample and a prediction sample value of the current sample of the current sub-block;
wherein the plurality of optical flow decision conditions comprises:
first indication information indicating that PROF is enabled for a picture containing the affine coded block or indicating that PROF is enabled for slices associated with a picture containing the affine coded block; and
second indication information indicating partition is applied to the affine coded block.

* * * * *